United States Patent
Uchimura et al.

(10) Patent No.: US 9,486,739 B2
(45) Date of Patent: Nov. 8, 2016

(54) HOLDING SEAL MATERIAL, MANUFACTURING METHOD FOR HOLDING SEAL MATERIAL, EXHAUST GAS PURIFICATION APPARATUS AND MANUFACTURING METHOD FOR EXHAUST GAS PURIFICATION APPARATUS

(71) Applicant: IBIDEN CO., LTD., Ogaki-shi, Gifu (JP)

(72) Inventors: Reo Uchimura, Takahama (JP); Hisashi Ando, Takahama (JP); Yasutaka Ito, Takahama (JP)

(73) Assignee: IBIDEN CO., LTD., Gifu (JP)

( * ) Notice: Subject to any disclaimer, the term of this patent is extended or adjusted under 35 U.S.C. 154(b) by 303 days.

(21) Appl. No.: 14/278,860

(22) Filed: May 15, 2014

(65) Prior Publication Data
US 2014/0356241 A1 Dec. 4, 2014

(30) Foreign Application Priority Data

Jun. 3, 2013 (JP) .................. 2013-117145

(51) Int. Cl.
*F01N 3/28* (2006.01)
*B01D 53/88* (2006.01)
(Continued)

(52) U.S. Cl.
CPC ............. *B01D 53/885* (2013.01); *B32B 1/08* (2013.01); *B32B 5/26* (2013.01); *B32B 7/12* (2013.01); *B32B 15/14* (2013.01); *B32B 27/12* (2013.01); *B32B 27/32* (2013.01); *B32B 27/36* (2013.01); *F01N 3/2853* (2013.01); *F01N 3/2864* (2013.01); *F01N 3/2871* (2013.01);
(Continued)

(58) Field of Classification Search
None
See application file for complete search history.

(56) References Cited

U.S. PATENT DOCUMENTS 8,231,835 B2 7/2012 Tabata
2009/0022633 A1 1/2009 Tomosue et al.
(Continued)

FOREIGN PATENT DOCUMENTS

EP 2388454 A1 11/2011
EP 2518289 A1 10/2012
(Continued)

OTHER PUBLICATIONS

European Extended Search Report, European Application No. 14166978.8, Oct. 14, 2014, 7 pages.
(Continued)

*Primary Examiner* — Walter D Griffin
*Assistant Examiner* — Jelitza Perez
(74) *Attorney, Agent, or Firm* — Fenwick & West LLP

(57) ABSTRACT

A holding seal material made of a laminated mat configured by laminating a plurality of mats containing an inorganic fiber and having a rectangular planar shape so that longitudinal-direction lengths of the respective mats sequentially increase as the mats are laminated, in which the film is attached to a principal surface of the mat configuring the laminated mat and having a longest longitudinal-direction length on an opposite side to a side on which the mat having the longest longitudinal-direction length is in contact with other mats and longitudinal-direction side surfaces of the mat having the longest longitudinal-direction length, and the film is attached to a principal surface of the mat having the longest longitudinal-direction length on the side on which the mat having the longest longitudinal-direction length is in contact with other mats in a state in which a part of the principal surface is exposed.

10 Claims, 9 Drawing Sheets

(51) Int. Cl.
- *B32B 5/26* (2006.01)
- *B32B 27/12* (2006.01)
- *B32B 7/12* (2006.01)
- *B32B 15/14* (2006.01)
- *B32B 27/32* (2006.01)
- *B32B 27/36* (2006.01)
- *B32B 1/08* (2006.01)

(52) U.S. Cl.
 CPC ........ *B32B2307/54* (2013.01); *F01N 2450/28* (2013.01); *Y10T 29/494* (2015.01); *Y10T 29/49826* (2015.01)

(56) References Cited

U.S. PATENT DOCUMENTS

| | | |
|---|---|---|
| 2009/0084268 A1 | 4/2009 | Saiki |
| 2009/0114097 A1 | 5/2009 | Saiki |
| 2009/0269255 A1 | 10/2009 | Yoshimi et al. |
| 2010/0071356 A1 | 3/2010 | Tabata |
| 2011/0280771 A1 | 11/2011 | Okabe |
| 2011/0280772 A1* | 11/2011 | Xiao ................. B32B 3/02 422/177 |
| 2012/0311982 A1* | 12/2012 | Mitani ................. F01N 3/0211 55/502 |

FOREIGN PATENT DOCUMENTS

| | | |
|---|---|---|
| JP | 2001-521847 A | 11/2001 |
| JP | 2003-129832 A | 5/2003 |
| JP | 2009-085092 A | 4/2009 |
| JP | 2010-101308 A | 5/2010 |
| JP | 2011-241820 A | 12/2011 |
| JP | 2012-233433 A | 11/2012 |
| WO | WO 91/19081 A1 | 12/1991 |
| WO | WO 99/23370 A1 | 5/1999 |
| WO | WO 2012/088003 A1 | 6/2012 |

OTHER PUBLICATIONS

Korean Office Action, Korean Application No. 10-2014-0048184, Jun. 15, 2015, 17 pages.

* cited by examiner

IV-IV LINE CROSS-SECTIONAL VIEW

HOLDING SEAL MATERIAL, MANUFACTURING METHOD FOR HOLDING SEAL MATERIAL, EXHAUST GAS PURIFICATION APPARATUS AND MANUFACTURING METHOD FOR EXHAUST GAS PURIFICATION APPARATUS

CROSS-REFERENCE TO RELATED APPLICATIONS

The present application claims priority under 35 U.S.C. §119(a) to Japanese Patent Application No. 2013-117145, filed on Jun. 3, 2013, which is incorporated by reference herein in its entirety.

BACKGROUND OF THE INVENTION

1. Field of the Invention

The present invention relates to a holding seal material, a manufacturing method for a holding seal material, an exhaust gas purification apparatus and a manufacturing method for an exhaust gas purification apparatus.

2. Background Art

Exhaust gas emitted from an internal-combustion engine such as a diesel engine contains particulate matter (hereinafter, also referred to as PM), and, in recent years, the harmful influence of the PM on the environment or human bodies has become an issue. In addition, exhaust gas also contains harmful gas components such as CO, HC or $NO_X$, and thus there is another concern regarding the influence of the harmful gas components on the environment or human bodies.

Therefore, a variety of exhaust gas purification apparatuses made up of an exhaust gas treatment unit made of a porous ceramic such as silicon carbide or cordierite, a metal casing housing the exhaust gas treatment unit, and a holding seal material made of an inorganic fiber and disposed between the exhaust gas treatment unit and the metal casing have been proposed as an exhaust gas purification apparatus that traps PM in exhaust gas or purifies the harmful gas components. The holding seal material is disposed mainly for preventing the exhaust gas treatment unit from coming into contact with the metal casing covering the outer circumference of the exhaust gas treatment unit so as not to be broken due to oscillation or impact generated during the running or the like of a vehicle or for preventing exhaust gas from leaking from between the exhaust gas treatment unit and the metal casing.

Since an internal-combustion engine is operated under a condition approximate to the theoretical air fuel ratio for the purpose of an improvement of gas mileage, there is a tendency for exhaust gas to have a high temperature and a high pressure. When the holding seal material is exposed to exhaust gas having a high temperature and a high pressure, there is a case in which the inorganic fiber constituting the holding seal material deteriorates due to heat. Therefore, the holding seal material is required to have excellent thermal resistance. In addition, when exhaust gas having a high temperature and a high pressure arrives at the exhaust gas purification apparatus, the space between the exhaust gas treatment unit and the metal casing may change due to the difference in thermal expansion coefficient between the exhaust gas treatment unit and the metal casing. Therefore, the holding seal material is required to have a strong holding force (expanding pressure) enough to sufficiently hold the exhaust gas treatment unit even when the space has been changed. Furthermore, the holding seal material is required to have a sufficient sealing property to prevent exhaust gas from leaking between the exhaust gas treatment unit and the metal casing.

In addition, since the holding seal material is made of an inorganic fiber, the holding seal material contains a large amount of a stimulant fine inorganic fiber (for example, a fiber having a diameter in a range of approximately 3 μm to 8 μm). When an exhaust gas treatment unit is produced using the above-described holding seal material, there is a problem in that the inorganic fiber scatters around from the holding seal material when an operator handles the holding seal material, and the operational environment deteriorates.

Furthermore, when the holding seal material is wound around the exhaust gas treatment unit, there is a case in which fissures are generated on the outer surface of the holding seal material. The fine inorganic fiber, sometimes, scatters through the fissures.

Japanese Unexamined Patent Application Publication No. 2003-129832 discloses a bilayer-structured holding seal material made up of a mat disposed on an exhaust gas treatment unit side and made of a ceramic fiber and a mat disposed on a metal casing side and made of a ceramic fiber.

In the holding seal material disclosed in Japanese Unexamined Patent Application Publication No. 2003-129832, a mat having excellent thermal resistance is disposed on the exhaust gas treatment unit side that reaches a high temperature, and a mat having excellent flexibility is disposed on the metal casing side, thereby preventing the deformation and quality deterioration of the holding seal material and improving the adhesion with the exhaust gas treatment unit or the metal casing.

In addition, in the holding seal material disclosed in Japanese Unexamined Patent Application Publication No. 2003-129832, the longitudinal-direction length of the mat disposed on the exhaust gas treatment unit side having a small curvature radius is made to be shorter than the longitudinal-direction length of the mat disposed on the metal casing side having a large curvature radius, thereby removing a gap in an engagement section when the holding seal material is wound around the exhaust gas treatment unit and improving the sealing property.

Furthermore, in the holding seal material disclosed in Japanese Unexamined Patent Application Publication No. 2003-129832, the holding seal material is sealed with an airtight sheet, thereby preventing the damage of the ceramic fiber and facilitating the attachment to the metal casing.

Japanese Unexamined Patent Application Publication No. 2010-101308 discloses a holding seal material housed in an inside space of a packaging material to decrease the scattering of the inorganic fiber from the holding seal material.

Japanese Unexamined Patent Application Publication No. 2001-521847 discloses a holding seal material having a flexible sheet or coating attached to the outside surface to prevent the generation of fissures on the outside surface of the holding seal material when the holding seal material is attached to the exhaust gas treatment unit.

SUMMARY OF THE INVENTION

When the holding seal material having the configuration as described in Japanese Unexamined Patent Application Publication No. 2003-129832 is wound around the exhaust gas treatment unit, the airtight sheet is present between the holding seal material and the exhaust gas treatment unit, and thus the adhesion between the holding seal material and the exhaust gas treatment unit degrades. That is, the holding seal material and the exhaust gas treatment unit are likely to deviate from each other. In Japanese Unexamined Patent Application Publication No. 2003-129832, the holding seal material is wound around the exhaust gas treatment unit, the exhaust gas treatment unit around which the holding seal material is wound is pinched using the metal casing separated into two segments from top and bottom, pressure is applied from top and bottom, the separated metal casing segments are adhered together, and the outer circumferential sections of the metal casing segments are fixed through a clinch process or the like, thereby producing an exhaust gas purification apparatus. In a case in which an exhaust gas purification apparatus is produced using the above-described method, there is almost no problem with the adhesion between the holding seal material and the exhaust gas treatment unit; however, for example, when an attempt was made to press the exhaust gas treatment unit around which the holding seal material having the configuration as described in Japanese Unexamined Patent Application Publication No. 2003-129832 is wound into the metal casing, the holding seal material had a problem of being deviated from the exhaust gas treatment unit and spread out from the end section of the metal casing. That is, the holding seal material having the configuration as described in Japanese Unexamined Patent Application Publication No. 2003-129832 had a problem since it was not suitable for the press-in method. The holding seal material having the configuration as described in Japanese Unexamined Patent Application Publication No. 2010-101308 also had the same problem.

In the holding seal material having the configuration as described in Japanese Unexamined Patent Application Publication No. 2001-521847, there was a problem in that it was not possible to sufficiently reduce the scattering of the inorganic fiber from the side surfaces of the holding seal material while it was possible to reduce the scattering of the inorganic fiber from the outside surface of the holding seal material to which the flexible sheet or coating was attached.

The invention has been made in consideration of the above-described problems, and an object of the invention is to provide a holding seal material capable of preventing the deviation of the holding seal material from the exhaust gas treatment unit and the spreading-out of the holding seal material from the end section of the metal casing when the exhaust gas treatment unit around which the holding seal material is wound is pressed into the metal casing and capable of reducing the scattering of the inorganic fiber, a manufacturing method for a holding seal material, an exhaust gas purification apparatus for which the above-described holding seal material is used, and a manufacturing method for an exhaust gas purification apparatus for which the above-described holding seal material is used.

To procure the above-described object, according to the invention, there is provided a holding seal material made of a laminated mat configured by laminating a plurality of mats containing an inorganic fiber and having a rectangular planar shape so that longitudinal-direction lengths of the respective mats sequentially increase as the mats are laminated, in which a film is attached to a principal surface of the mat configuring the laminated mat and having a longest longitudinal-direction length on an opposite side to a side on which the mat having the longest longitudinal-direction length is in contact with other mats and longitudinal-direction side surfaces of the mat having the longest longitudinal-direction length, and the film is attached to a principal surface of the mat having the longest longitudinal-direction length on the side on which the mat having the longest longitudinal-direction length is in contact with other mats in a state in which a part of the principal surface is exposed.

The holding seal material of the invention is generally used for an exhaust gas purification apparatus made up of an exhaust gas treatment unit, a metal casing housing the exhaust gas treatment unit, and a holding seal material disposed between the exhaust gas treatment unit and the metal casing. The holding seal material of the invention is wound around the exhaust gas treatment unit, and the exhaust gas treatment unit around which the holding seal material of the invention is wound is housed in the metal casing.

The holding seal material of the invention is made of a laminated mat configured by laminating a plurality of mats containing an inorganic fiber and having a rectangular planar shape so that longitudinal-direction lengths of the respective mats sequentially increase as the mats are laminated.

Generally, the holding seal material of the invention is wound so that a mat having a shortest longitudinal-direction length comes into contact with the exhaust gas treatment unit. Therefore, the longitudinal-direction lengths of the respective mats forming the holding seal material wound around the exhaust gas treatment unit increase toward the outside from the mat in contact with the exhaust gas treatment unit. Therefore, when the holding seal material of the invention is wound around the exhaust gas treatment unit, a gap caused by the difference between the inside and outside circumferences is not easily generated in a part in which the end surfaces of the holding seal material of the invention are joined together. Therefore, the exhaust gas purification apparatus for which the holding seal material of the invention is used has a sufficient sealing property against the leakage of exhaust gas.

In the holding seal material of the invention, a film is attached to the principal surface of the mat configuring the laminated mat and having the longest longitudinal-direction length on the opposite side to the side on which the mat having the longest longitudinal-direction length is in contact with other mats.

The inorganic fiber scatters from the surfaces of the mats. Particularly, the curvature radius of the mat located in the outermost layer of the laminated mat becomes largest when the holding seal material is wound around the exhaust gas treatment unit, and therefore tensile stress also becomes largest. The inorganic fiber is likely to be shattered due to the tensile stress. As a result, fissures and the like are generated on the mat surfaces, and the inorganic fiber is likely to scatter.

However, when a film is attached to the surfaces as in the holding seal material of the invention, it is possible to reduce the above-described scattering of the inorganic fiber.

The scattering of the inorganic fiber from the holding seal material occurs not only on the principal surfaces of the holding seal material but also on the longitudinal-direction side surfaces of the holding seal material. The longitudinal-direction side surface refers to a surface located in a part forming a long side of a rectangular planar shape of the mat. Particularly, when the exhaust gas treatment unit around which the holding seal material is wound is pressed into the metal casing, the holding seal material is compressed in the thickness direction. Therefore, it is likely that air leaks from the longitudinal-direction side surfaces of the holding seal material. Along with the leakage of air, the inorganic fiber is also likely to scatter. The inorganic fiber scattering from the longitudinal-direction side surfaces of the holding seal material as described above cannot be ignored by improving the operational environment.

In the holding seal material of the invention, a film is attached to the longitudinal-direction side surfaces of the mat having the longest longitudinal-direction length. Therefore, it is possible to reduce the scattering of the inorganic fiber from a part to which the film is attached. Therefore, it is possible to reduce the scattering of the inorganic fiber when handling the holding seal material of the invention.

When the principal surface of the mat having the longest longitudinal-direction length on the side on which the mat having the longest longitudinal-direction length is in contact with other mats is fully covered with a film, the adhesion between the mat having the longest longitudinal-direction length and other mats in contact with the mat becomes weak. Therefore, when an attempt is made to press the exhaust gas treatment unit around which the holding seal material having the above-described configuration is wound into the metal casing, the mat having the longest longitudinal-direction length and other mats in contact with the mat are likely to be deviated from each other. Therefore, the mat that has been deviated from the end section of the metal casing is likely to spread out. However, in the holding seal material of the invention, the film is attached to the principal surface of the mat having the longest longitudinal-direction length on the side on which the mat having the longest longitudinal-direction length is in contact with other mats in a state in which a part of the principal surface is exposed. In the exposed part, the mat having the longest longitudinal-direction length comes into direct contact with other mats. That is, in the exposed part, the inorganic fiber strands included in the respective mats come into direct contact with each other and are entangled with each other, whereby the adhesion between the mats improves. Furthermore, when the exhaust gas treatment unit around which the holding seal material of the invention is wound is pressed into the metal casing, the mat having the longest longitudinal-direction length and other mats in contact with the mat are not easily deviated from each other due to the friction between the inorganic fiber strands. Therefore, it is possible to prevent the mat from spreading out from the end section of the metal casing.

In the holding seal material of the invention, it is desirable that the film be continuously wound once in a direction perpendicular to the longitudinal direction of the mat having the longest longitudinal-direction length and be attached to the surface of the mat, a winding start section and a winding end section of the film be present on the principal surface on the side on which the mat having the longest longitudinal-direction length is in contact with other mats, and the winding start section and the winding end section be separated from each other.

The film being wound once means that, when the winding start section and the winding end section are present on the same principal surface, the winding of the film starts from the winding start section, sequentially passes through the side surface close to the winding start section, the principal surface on the opposite side to the principal surface on which the winding start section and the winding end section are present, the side surface close to the winding end section and the winding end section, and ends when the film first passes through the winding end section.

The winding start section and the winding end section being separated from each other means that the winding start section and the winding end section are away from each other, and consequently, there is no film present between the winding start section and the winding end section.

In the holding seal material having the above-described configuration, there is no joint in the attached film. Therefore, there is no case in which the inorganic fiber scatters from the joint in the film. Therefore, it is possible to reduce the scattering of the inorganic fiber from the holding seal material.

In addition, a part of the film attached to the principal surface on the side on which the mat having the longest longitudinal-direction length is in contact with other mats is interposed between the mat having the longest longitudinal-direction length and other mats. Therefore, it is possible to prevent the peeling of the film.

In the holding seal material of the invention, the laminated mat is desirably made up of two mats.

When the laminated mat includes three or more mats, the volume of the holding seal material increases when producing the holding seal material or winding the holding seal material around the exhaust gas treatment unit, the operation increases, and it becomes difficult to efficiently handle the holding seal material. However, when the holding seal material is a laminated mat configured by laminating two mats, it is possible to easily produce the holding seal material. In addition, it is possible to easily handle the holding seal material when transporting the holding seal material or winding the holding seal material around the exhaust gas treatment unit.

In the holding seal material of the invention, a constituent material of the film is desirably made of at least one selected from a group consisting of polyester, high-density polyethylene and polypropylene.

As described above, the holding seal material of the invention is generally wound around the exhaust gas treatment unit and is pressed into the metal casing. At this time, the mat located in the outermost layer of the laminated mat and having the longest longitudinal-direction length is in contact with the metal casing through the film.

When the constituent material of the film is desirably made of at least one selected from a group consisting of polyester, high-density polyethylene and polypropylene, the friction coefficient between the mat and the metal casing becomes low. Therefore, it is possible to smoothly press the exhaust gas treatment unit around which the holding seal material of the invention is wound into the metal casing.

In the holding seal material of the invention, the film is desirably fixed to the laminated mat using an adhesive material or thermal compression.

When an adhesive material or thermal compression is used, it is possible to firmly fix the film to the holding seal material.

In the holding seal material of the invention, the plurality of mats configuring the laminated mat is desirably united using at least one band-like body having no fixing force.

In the holding seal material having the above-described configuration, since the mats are not fixed to each other, it is possible to deviate the mat in the longitudinal direction when winding the holding seal material around the exhaust gas treatment unit. Therefore, even in a case in which the mats are in deviated locations, it is possible to finely adjust the relative locations of the mats when winding the holding seal material around the exhaust gas treatment unit. As a result, a gap is not easily generated in the part in which the end surfaces of the holding seal material are joined together.

In the holding seal material of the invention, the band-like body is desirably made of paper or a resin.

Paper or a resin can be preferably used as the band-like body having no fixing force between the mat surface and the band-like body.

In the holding seal material of the invention, the plurality of mats configuring the laminated mat are desirably fixed to each other in at least one fixing section.

When the plurality of mats are fixed to each other in at least one fixing section, there is no case in which the mats are separated from each other, and thus it becomes easy to handle the holding seal material. In addition, it is possible to easily wind the holding seal material around the exhaust gas treatment unit without individually aligning the respective mats.

In the holding seal material of the invention, the fixing section desirably extends in a direction perpendicular to the longitudinal direction of the laminated mat.

When the fixing section extends in a direction perpendicular to the longitudinal direction of the holding seal material, it is possible to prevent the respective mats from deviating in a direction perpendicular to the longitudinal direction of the holding seal material when winding the holding seal material around the exhaust gas treatment unit.

In addition, when the fixing section extends in a direction in parallel with the longitudinal direction of the holding seal material, when winding the holding seal material around the exhaust gas treatment unit, tensile stress is likely to be generated in the outer circumferential part of the holding seal material, and wrinkles are likely to be generated in the inner circumferential part of the holding seal material. Therefore, a gap is generated between the holding seal material and the exhaust gas treatment unit. However, when the fixing section extends in a direction perpendicular to the longitudinal direction of the holding seal material, it is possible to prevent the generation of the tensile stress or the generation of the wrinkles, and thus a gap is not easily generated between the holding seal material and the exhaust gas treatment unit.

In the holding seal material of the invention, the fixing section is desirably made of a thread, adhesive tape or an adhesive material.

A thread, adhesive tape or an adhesive material can be preferably used for the fixing section fixing the plurality of mats.

According to the invention, there is provided an exhaust gas purification apparatus including an exhaust gas treatment unit, a metal casing housing the exhaust gas treatment unit, and a holding seal material disposed between the exhaust gas treatment unit and the metal casing, in which the holding seal material is a laminated mat configured by laminating a plurality of mats containing an inorganic fiber and having a rectangular planar shape so that longitudinal-direction lengths of the respective mats sequentially increase as the mats are laminated, the holding seal material is disposed so that a mat configuring the laminated mat and having a longest longitudinal-direction length is on a metal casing side and a mat configuring the laminated mat and having a shortest longitudinal-direction length is on an exhaust gas treatment unit side, a film is attached to a principal surface of the mat having a longest longitudinal-direction length on an opposite side to a side on which the mat having the longest longitudinal-direction length is in contact with other mats and longitudinal-direction side surfaces of the mat having the longest longitudinal-direction length, and the film is attached to a principal surface of the mat having the longest longitudinal-direction length on the side on which the mat having the longest longitudinal-direction length is in contact with other mats in a state in which a part of the principal surface is exposed.

In the exhaust gas purification apparatus of the invention, since the holding seal material of the invention is used, the above-described effects are exhibited.

In the exhaust gas purification apparatus of the invention, it is desirable that the film be continuously wound once in a direction perpendicular to the longitudinal direction of the mat having the longest longitudinal-direction length and be attached to the surfaces of the mat, a winding start section and a winding end section of the film be present on the principal surface on the side on which the mat having the longest longitudinal-direction length is in contact with other mats, and the winding start section and the winding end section be separated from each other.

In the exhaust gas purification apparatus having the above-described configuration, there is no joint in the film attached to the holding seal material. Therefore, there is no case in which the inorganic fiber scatters from the joint in the film. Therefore, it is possible to reduce the scattering of the inorganic fiber from the holding seal material when manufacturing the exhaust gas purification apparatus.

According to the invention, there is provided a manufacturing method for an exhaust gas purification apparatus that includes an exhaust gas treatment unit, a metal casing housing the exhaust gas treatment unit, and a holding seal material disposed between the exhaust gas treatment unit and the metal casing, in which the holding seal material is a laminated mat configured by laminating a plurality of mats containing an inorganic fiber and having a rectangular planar shape so that longitudinal-direction lengths of the respective mats sequentially increase as the mats are laminated, the holding seal material is disposed so that a mat configuring the laminated mat and having a longest longitudinal-direction length is on a metal casing side and a mat configuring the laminated mat and having a shortest longitudinal-direction length is on an exhaust gas treatment unit side, including a step of attaching a film to both principal surfaces and longitudinal-direction side surfaces of the mat having the longest longitudinal-direction length so that a part of one of the principal surfaces of the mat is exposed; a step of obtaining a laminated mat by laminating the respective mats so that the longitudinal-direction lengths of the respective mats sequentially increase as the mats are laminated and by disposing the mat having the longest longitudinal-direction length so that the principal surface of the mat having the longest longitudinal-direction length and disposed on the top layer on a side on which a part is exposed comes into contact with other mats; a step of winding the laminated mat around the exhaust gas treatment unit so that the mat having the longest longitudinal-direction length is on a metal casing side and the mat having the shortest longitudinal-direction length is on an exhaust gas treatment unit side; and a step of pressing the exhaust gas treatment unit around which the laminated mat is wound into the metal casing.

In the manufacturing method for an exhaust gas purification apparatus of the invention, since the holding seal material of the invention is used, the above-described effects are exhibited.

In the manufacturing method for an exhaust gas purification apparatus of the invention, it is desirable that the film be continuously wound once in a direction perpendicular to the longitudinal direction of the mat having the longest longitudinal-direction length and be attached to the surfaces of the mat, a winding start section and a winding end section of the film be present on the principal surface a part of which is exposed, and the winding start section and the winding end section be separated from each other.

When the film is attached as described above, it is possible with a single operation to attach the film to the principal surfaces and longitudinal-direction side surfaces of the mat having the longest longitudinal-direction length so that a part of one of the principal surfaces of the mat is exposed. Therefore, it is possible to efficiently attach the film. In addition, when the film is attached as described above, it is possible to attach the film with no joint formed. When there is no joint in the film, there is no case in which the inorganic fiber scatters from a joint. Therefore, it is possible to reduce the scattering of the inorganic fiber in the step of winding the laminated mat around the exhaust gas treatment unit and the step of pressing the exhaust gas treatment unit around which the laminated mat is wound into the metal casing.

DETAILED DESCRIPTION OF THE INVENTION

Hereinafter, the invention will be specifically described. However, the invention is not limited to the following description, and the invention can be appropriately modified and applied within the scope of the concept of the invention. Meanwhile, combinations of two or more of individual desirable configurations of the invention described below are also considered as the invention.

Figure 1:
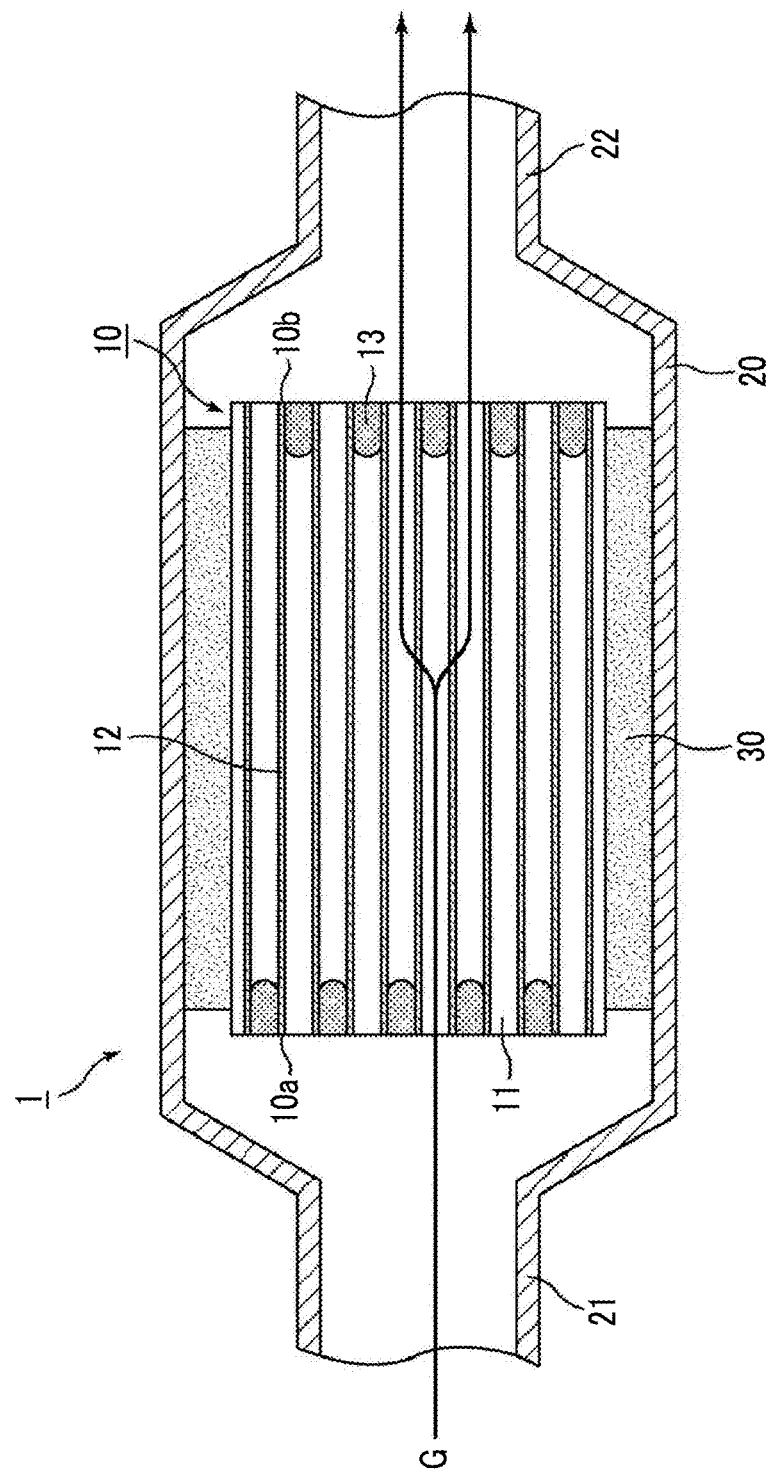
FIG. 1 is a cross-sectional view schematically illustrating an example of an exhaust gas purification apparatus of the invention.

FIG. 1 is a cross-sectional view schematically illustrating an example of an exhaust gas purification apparatus of the invention. As illustrated in FIG. 1, an exhaust gas purification apparatus 1 that is an example of the exhaust gas purification apparatus of the invention is made up of an exhaust gas treatment unit 10, a metal casing 20 covering the outside of the exhaust gas treatment unit 10, and a holding seal material 30 disposed between the exhaust gas treatment unit 10 and the metal casing 20, an introduction tube 21 coupled to an internal-combustion engine such as an engine is connected to an end section of the metal casing 20 on which exhaust gas is introduced, and an exhaustion tube 22 coupled to the outside is connected to the other end section of the metal casing 20.

Meanwhile, in the exhaust gas purification apparatus 1 illustrated in FIG. 1, an exhaust gas filter (honeycomb filter) having cells blocked with a sealing material 13 at any one end is used as the exhaust gas treatment unit 10.

Hereinafter, a case in which exhaust gas passes through the exhaust gas purification apparatus 1 having the above-described configuration will be described with reference to FIG. 1.

As illustrated in FIG. 1, exhaust gas that has been discharged from an internal-combustion engine and has flowed into the exhaust gas purification apparatus 1 (in FIG. 1, the exhaust gas is represented by G, and the flow of the exhaust gas is indicated by an arrow) flows into one cell 11 opened on an exhaust gas inflow-side end surface 10a of the exhaust gas treatment unit 10, and passes through the cell wall 12 separating the cell 11. At this time, PM in the exhaust gas is trapped in the cell wall 12 so as to purify the exhaust gas. The purified exhaust gas flows out through other cells 11 opened on an exhaust gas outflow-side end surface 10b, and is discharged outside.

Figure 2A:
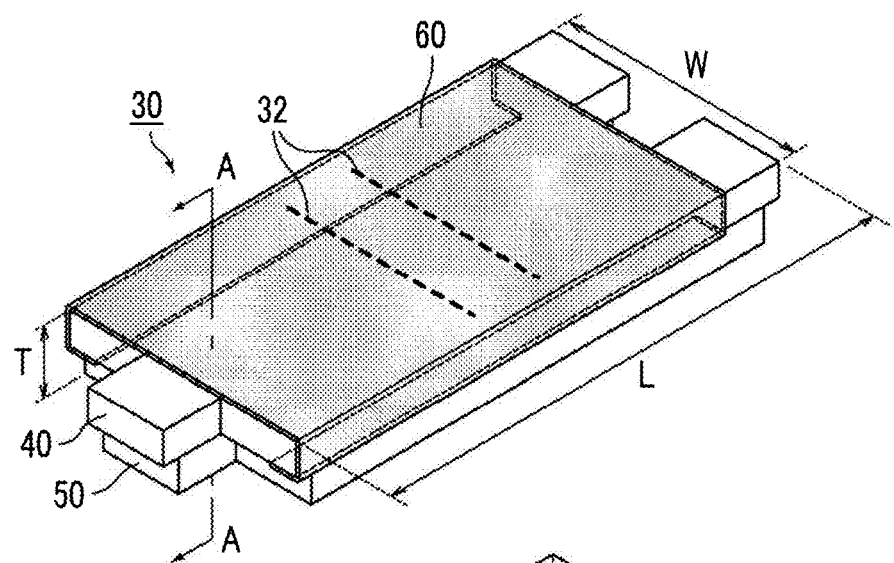
FIG. 2A is a perspective view schematically illustrating an example of the holding seal material of the invention.
Figure 2B:
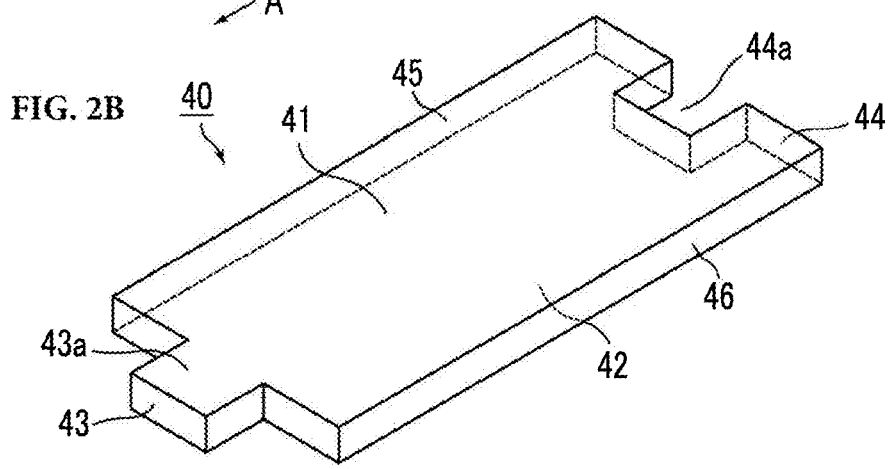
FIG. 2B is a perspective view schematically illustrating an example of an upper layer mat configuring the holding seal material of the invention.
Figure 2C:
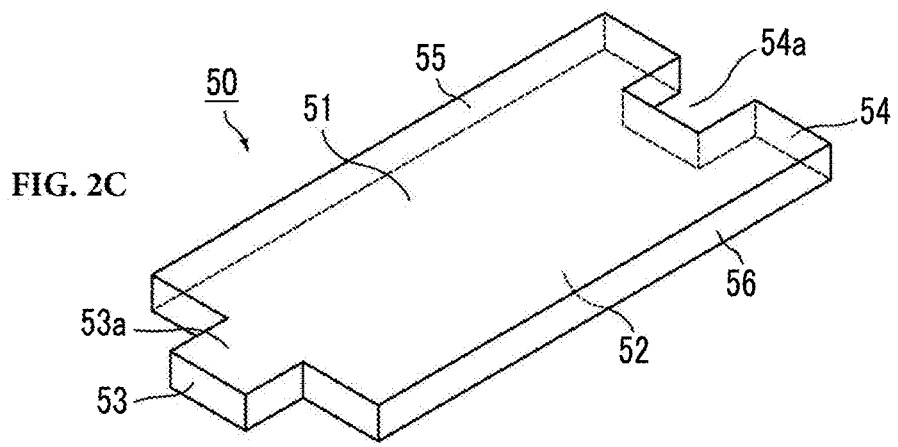
FIG. 2C is a perspective view schematically illustrating an example of a lower layer mat configuring the holding seal material of the invention.

Next, the holding seal material 30 of the invention will be described. FIG. 2A is a perspective view schematically illustrating an example of the holding seal material of the invention. FIG. 2B is a perspective view schematically illustrating an example of an upper layer mat configuring the holding seal material of the invention. FIG. 2C is a perspective view schematically illustrating an example of a lower layer mat configuring the holding seal material of the invention.

The holding seal material 30 of the invention illustrated in FIG. 2A has a predetermined longitudinal direction length (hereinafter, also referred to simply as full length, indicated by arrow L in FIG. 2A), a predetermined width (indicated by arrow W in FIG. 2A) and a predetermined thickness (indicated by arrow T in FIG. 2A), and is made up of two laminated mats of a upper layer mat 40 and a lower layer mat 50 both of which contain an inorganic fiber and have a rectangular planar shape.

The upper layer mat 40 includes a first principal surface 41 that is not in contact with the lower layer mat 50 and a second principal surface 42 that is a principal surface on the opposite side to the first principal surface 41 and is in contact with the lower layer mat 50. In addition, the upper layer mat 40 includes an end surface 43 on which a protrusion section 43a is formed, an end surface 44 on which a recess section 44a is formed, a first side surface 45 that is a side surface in the longitudinal direction, and a second side surface 46 that is a side surface on the opposite side to the first side surface 45. The side surface in the longitudinal direction refers to a surface located in a part forming the long side of a rectangular planar shape of the upper layer mat 40. The protrusion section 43a and the recess section 44a have shapes that fitly engage with each other when winding the holding seal material 30 around the exhaust gas treatment unit 10 to manufacture the exhaust gas purification apparatus 1.

The lower layer mat 50 includes a first principal surface 51 that is in contact with the upper layer mat 40 and a second principal surface 52 that is a principal surface on the opposite side to the first principal surface 51 and is not in contact with the upper layer mat 40. In addition, the lower layer mat 50 includes an end surface 53 on which a protrusion section 53a is formed, an end surface 54 on which a recess section 54a is formed, a first side surface 55 that is a side surface in the longitudinal direction, and a second side surface 56 that is a side surface on the opposite side to the first side surface 55. The side surface in the longitudinal direction refers to a surface located in a part forming the long side of a rectangular planar shape of the lower layer mat 50. The protrusion section 53a and the recess section 54a have shapes that fitly engage with each other when winding the holding seal material 30 around the exhaust gas treatment unit 10 to manufacture the exhaust gas purification apparatus 1.

In the exhaust gas purification apparatus 1 of the invention, the upper layer mat 40 is a mat disposed on a metal casing 20 side, and the lower layer mat 50 is a mat disposed on an exhaust gas treatment unit 10 side.

In the holding seal material 30 of the invention, the full length of the upper layer mat 40 is longer than the full length of the lower layer mat 50 so as to prevent the generation of a gap on the end surface of the holding seal material when winding the holding seal material 30 around the exhaust gas treatment unit 10. This fact will be described using FIGS. 3A and 3B.

Figure 3A:
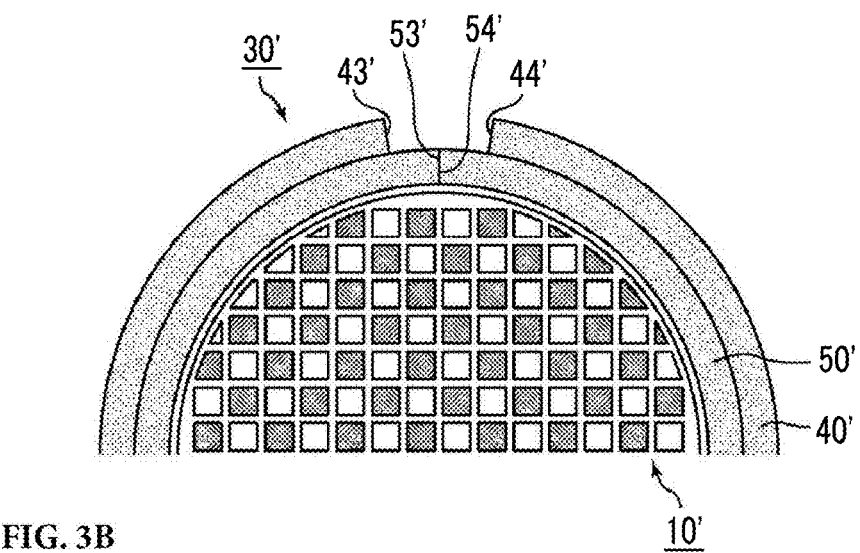
FIG. 3A is a view schematically illustrating a cross-section of an exhaust gas treatment unit around which a holding seal material having an upper layer mat and a lower layer mat with substantially the same length is wound cut in a direction perpendicular to a longitudinal direction, and is an enlarged view enlarging a part in which end surfaces of the holding seal material are joined together.
Figure 3B:
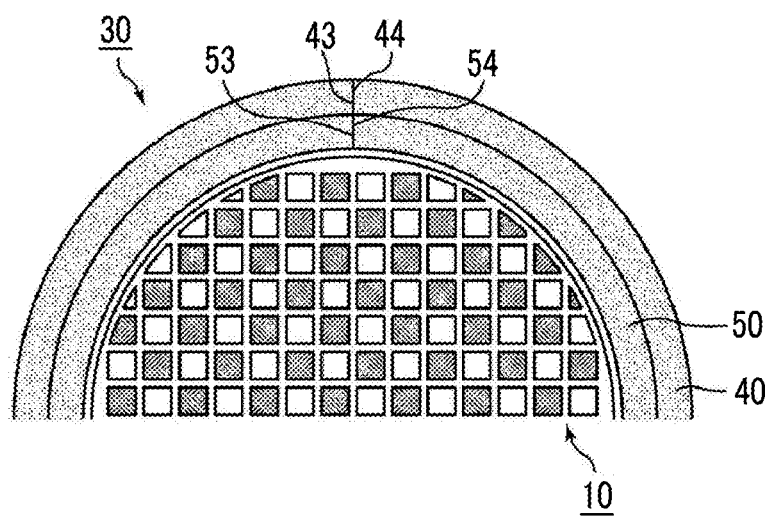
FIG. 3B is a view schematically illustrating a cross-section of an exhaust gas treatment unit around which the holding seal material of the invention is wound cut in a direction perpendicular to the longitudinal direction, and is an enlarged view enlarging a part in which end surfaces of the holding seal material of the invention are joined together.

FIG. 3A is a view schematically illustrating the cross-section of the exhaust gas treatment unit around which a holding seal material having a upper layer mat and a lower layer mat with substantially the same length is wound cut in a direction perpendicular to the longitudinal direction, and is an enlarged view enlarging a part in which end surfaces of the holding seal material are joined together. FIG. 3B is a view schematically illustrating the cross-section of the exhaust gas treatment unit around which the holding seal material of the invention is wound cut in a direction perpendicular to the longitudinal direction, and is an enlarged view enlarging a part in which end surfaces of the holding seal material of the invention are joined together.

As illustrated in FIG. 3A, when the full length of an upper layer mat 40' and the full length of a lower layer mat 50' configuring a holding seal material 30' are substantially the same, a gap is generated due to the difference between the inside and outside circumferences when winding the holding seal material 30' around the exhaust gas treatment unit 10'. That is, an end surface 53' and an end surface 54' of the lower layer mat 50' engage with each other substantially with no gap therebetween, but a gap is generated between an end surface 43' and an end surface 44' of the upper layer mat 40' due to the difference between the inside and outside circumferences.

On the other hand, as illustrated in FIG. 3B, in the holding seal material 30 of the invention, the full length of the upper layer mat 40 configuring the holding seal material 30 is longer than the full length of the lower layer mat 50 so as to fill the above-described gap caused by the difference between the inside and outside circumferences. Therefore, when the holding seal material 30 is wound around the exhaust gas treatment unit 10, the end surface 43 and the end surface 44 of the upper layer mat 40 engage with each other substantially with no gap therebetween.

Therefore, the exhaust gas purification apparatus 1 for which the holding seal material 30 of the invention is used has a sufficient sealing property against the leakage of exhaust gas. The full length of the upper layer mat 40 is desirably 1.05 times to 1.10 times the full length of the lower layer mat 50.

The upper layer mat 40 and the lower layer mat 50 are needle mats obtained by carrying out a needling treatment on a base mat made of an inorganic fiber. Meanwhile, the needling treatment refers to the insertion and removal of fiber-intermingling means such as a needle against the base mat. In the upper layer mat 40 and the lower layer mat 50, long inorganic fibers having a relatively long fiber length are three-dimensionally intermingled through the needling treatment. The needling treatment is carried out on the mat in the width direction perpendicular to the longitudinal direction.

Meanwhile, the inorganic fiber has a certain average fiber length to produce an intermingled structure, and, for example, the average fiber length of the inorganic fiber may be in a range of approximately 50 µm to 100 mm.

The average fiber diameter of the inorganic fiber configuring the upper layer mat 40 and the lower layer mat 50 is desirably in a range of 1 µm to 20 µm, and more desirably in a range of 3 µm to 10 µm.

When the average fiber diameter of the inorganic fiber is in a range of 1 µm to 20 µm, the strength and flexibility of the inorganic fiber become sufficiently high, and it is possible to improve the shear strength of the upper layer mat 40 and the lower layer mat 50.

When the average fiber diameter of the inorganic fiber is less than 1 µm, the inorganic fiber is thin and easily breakable, and thus the tensile strength of the inorganic fiber becomes insufficient. On the other hand, when the average fiber diameter of the inorganic fiber exceeds 20 µm, the inorganic fiber is not easily bent, and thus the flexibility becomes insufficient.

The basis weights (weight per unit area) of the upper layer mat 40 and the lower layer mat 50 are not particularly limited, but are desirably in a range of 200 g/m$^2$ to 4000 g/m$^2$, and more desirably in a range of 1000 g/m$^2$ to 3000 g/m$^2$. When the basis weights of the upper layer mat 40 and the lower layer mat 50 are less than 200 g/m$^2$, the holding force is not sufficient, and, when the basis weights of the upper layer mat 40 and the lower layer mat 50 exceed 4000 g/m$^2$, it is difficult to make the bulks of the upper layer mat 40 and the lower layer mat 50 small. Therefore, in a case in which the exhaust gas purification apparatus 1 is manufactured using the upper layer mat 40 and the lower layer mat 50, the exhaust gas treatment unit 10 is likely to drop.

In addition, the bulk densities (bulk density of the holding seal material before being wound) of the upper layer mat 40 and the lower layer mat 50 are not particularly limited, but are desirably in a range of 0.10 g/cm$^3$ to 0.30 g/cm$^3$. When the bulk densities of the upper layer mat 40 and the lower layer mat 50 are less than 0.10 g/cm$^3$, the entanglement of the inorganic fiber is weak, and the inorganic fiber is easily peeled, and thus it becomes difficult to maintain the shapes of the upper layer mat 40 and the lower layer mat 50 in a predetermined shape.

In addition, when the bulk densities of the respective mats exceed 0.30 g/cm$^3$, the upper layer mat 40 and the lower layer mat 50 become hard such that it becomes more difficult to wind the holding seal material around the exhaust gas treatment unit 10, and the respective mats become more breakable.

The upper layer mat 40 and the lower layer mat 50 may further contain a binder such as an organic binder to suppress an increase in bulk or to improve the workability before the assembling of the exhaust gas purification apparatus 1.

In addition, the thicknesses of the upper layer mat 40 and the lower layer mat 50 are desirably in a range of 1.5 mm to 15 mm.

Figure 4:
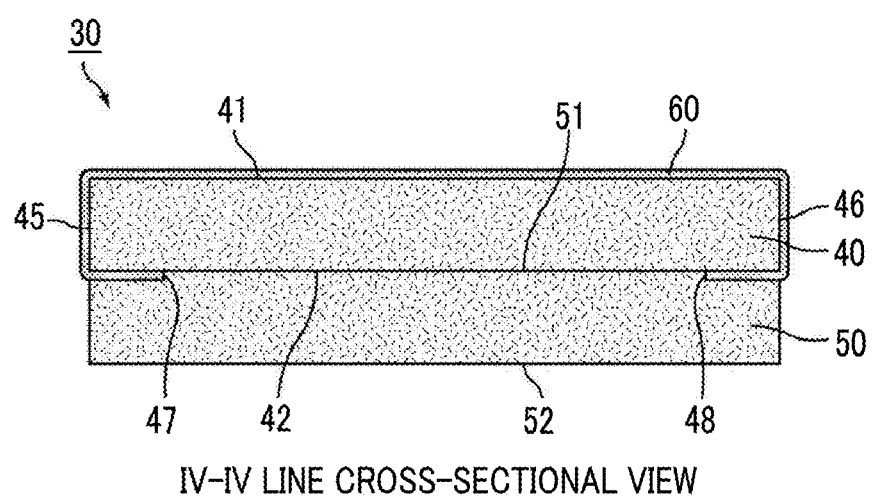
FIG. 4 is a cross-sectional view taken along IV-IV line in FIG. 2A.

FIG. 4 is a cross-sectional view taken along IV-IV line in FIG. 2A. As illustrated in FIG. 4, a film 60 is attached to the holding seal material 30. The film 60 is a single sheet, and is continuously wound once in a direction perpendicular to the longitudinal direction of the upper layer mat 40 from a winding start section 47 to a winding end section 48 on the second principal surface 42 of the upper layer mat 40 and is attached to the surfaces of the mat. That is, the film 60 is continuously wound from the winding start section 47 on the second principal surface 42 of the upper layer mat 40 as a start section for winding to the winding end section 48 on the second principal surface 42 of the upper layer mat 40 along the second principal surface 42 of the upper layer mat 40, the first side surface 45, the first principal surface 41, the second side surface 46 and the second principal surface 42. In addition, the winding start section 47 and the winding end section 48 are separated from each other so as to expose a part of the second principal surface 42 of the upper layer mat 40.

In the holding seal material 30 of the invention, since the film 60 is attached to the second principal surface 42 of the upper layer mat 40 in a state in which a part of the second principal surface 42 is exposed, the second principal surface 42 of the upper layer mat 40 and the first principal surface 51 of the lower layer mat 50 come into direct contact with each other in the exposed part, and the inorganic fiber strands included in the respective mats are directly entangled with each other. Therefore, the adhesion between the upper layer mat 40 and the lower layer mat 50 improves. Furthermore, when the exhaust gas treatment unit 10 around which the holding seal material 30 of the invention is wound is pressed into the metal casing 20, the respective mats do not easily deviate from each other due to the friction between the inorganic fiber strands included in the respective mats. Therefore, it is possible to prevent the upper layer mat 40 from deviating and spreading out from the end section of the metal casing 20.

The area of the first principal surface 51 of the lower layer mat 50 in direct contact with the second principal surface 42 of the upper layer mat 40 is desirably in a range of 40% to 90%, and more desirably in a range of 80% to 90% of the first principal surface 51 of the lower layer mat 50. Within the above-described range, it is possible to sufficiently suppress the deviation of the respective mats.

The film 60 is attached to the first principal surface 41 of the upper layer mat 40.

When the holding seal material 30 is wound around the exhaust gas treatment unit 10, the upper layer mat 40 is located outside the lower layer mat 50. Therefore, the curvature radius of the upper layer mat 40 is larger than the curvature radius of the lower layer mat 50, and therefore tensile stress becomes large.

The inorganic fiber is likely to be shattered due to the tensile stress. As a result, fissures and the like are generated on the first principal surface 41 of the upper layer mat 40, and the inorganic fiber is likely to scatter.

However, the film 60 is attached to the holding seal material 30 of the invention. Therefore, it is possible to reduce the scattering of the inorganic fiber from the first principal surface 41.

In the holding seal material 30 of the invention, the film 60 is attached to the first side surface 45 and the second side surface 46 of the upper layer mat 40.

The scattering of the inorganic fiber from the holding seal material 30 occurs not only on the first principal surface 41 of the upper layer mat 40 but also on the first side surface 45 and the second side surface 46 of the upper layer mat 40.

Particularly, when the exhaust gas treatment unit 10 around which the holding seal material 30 is wound is pressed into the metal casing 20, the holding seal material 30 is compressed in the thickness direction. Therefore, air leaks from the first side surface 45 and the second side surface 46 of the upper layer mat 40. As air leaks, the inorganic fiber is also likely to scatter.

When the film 60 is attached to the first side surface 45 and the second side surface 46 of the upper layer mat 40 as in the holding seal material 30 of the invention, it is possible to reduce the scattering of the inorganic fiber from a part to which the film 60 is attached. Therefore, it is possible to reduce the scattering of the inorganic fiber when handling the holding seal material 30.

As described above, the film 60 is a single sheet, and is continuously wound once in a direction perpendicular to the longitudinal direction of the upper layer mat 40 from the winding start section 47 to the winding end section 48 on the second principal surface 42 of the upper layer mat 40 and is attached to the surfaces of the mat. Therefore, there is no joint in the attached film 60. Therefore, there is no case in which the inorganic fiber scatters from the joint. As a result, it is possible to reduce the scattering of the inorganic fiber from the holding seal material 30.

In addition, a part of the film 60 attached to the second principal surface 42 of the upper layer mat 40 is interposed between the upper layer mat 40 and the lower layer mat 50. Therefore, it is possible to prevent the peeling of the film 60.

Figure 5A:
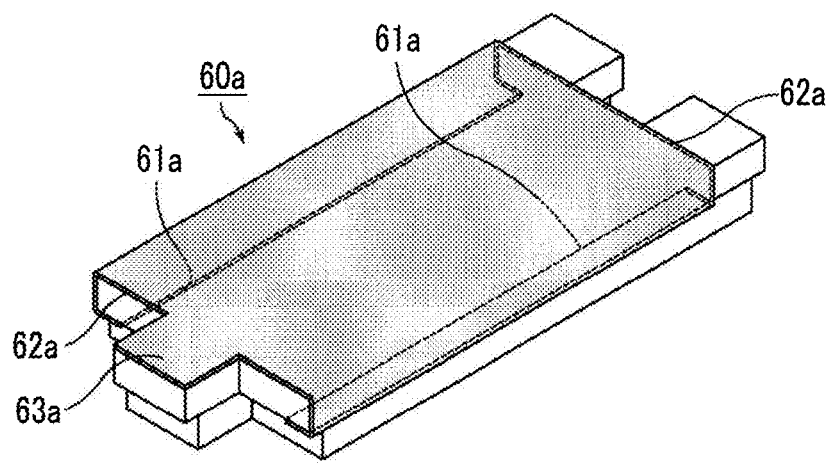
FIGS. 5A to 5C are views schematically illustrating examples of shapes of films attached to the holding seal material of the invention.
Figure 5B:
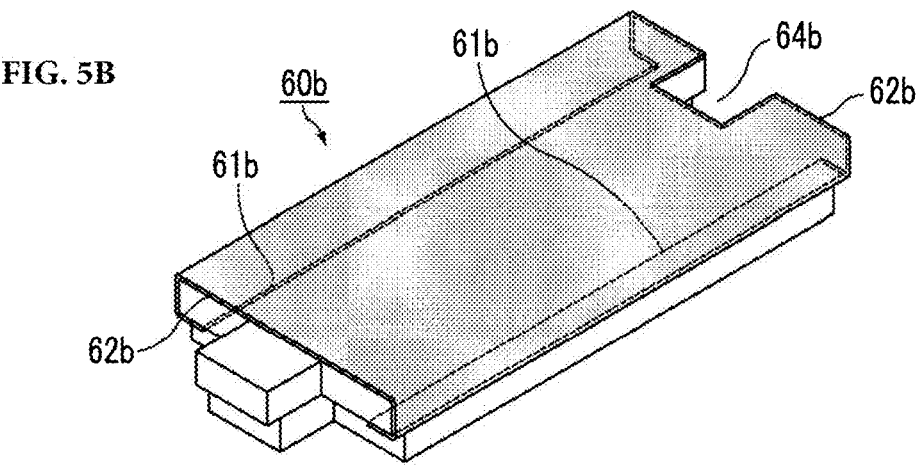
Figure 5C:
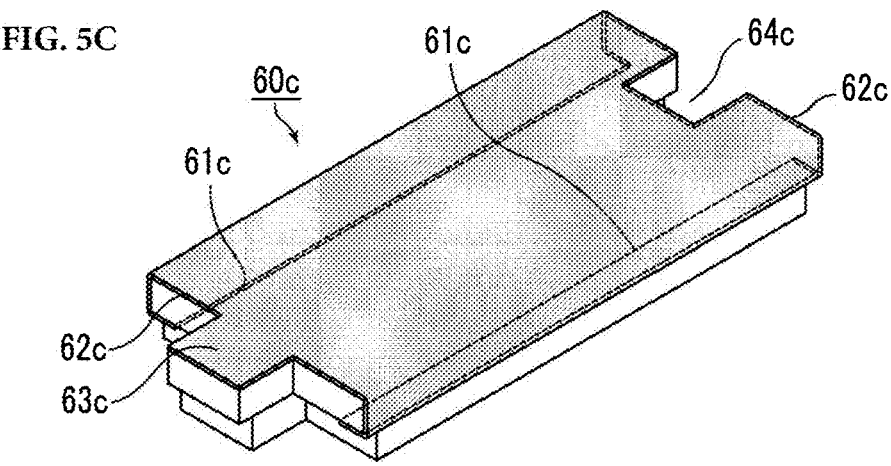

FIGS. 5A to 5C are views schematically illustrating examples of shapes of films attached to the holding seal material of the invention. FIGS. 5A to 5C illustrate states of the respective films attached to the holding seal material in a perspective manner.

As the shape of the film 60, it is possible to employ an arbitrary shape as illustrated in FIGS. 5A to 5C.

A film 60a illustrated in FIG. 5A is substantially rectangular, and has long sides 61a and short sides 62a. A protrusion section 63a is formed on one short side 62a of the film 60a.

When attaching the film 60a to the upper layer mat 40, the film 60a is attached to the upper layer mat 40 so that the protrusion section 63a of the film 60a covers the protrusion section 43a of the upper layer mat 40.

A film 60b illustrated in FIG. 5B is substantially rectangular, and has long sides 61b and short sides 62b. A recess section 64b is formed on one short side 62b of the film 60b.

When attaching the film 60b to the upper layer mat 40, the film 60b is attached to the upper layer mat 40 so that the recess section 64b of the film 60b covers the recess section 44a of the upper layer mat 40.

A film 60c illustrated in FIG. 5C is substantially rectangular, and has long sides 61c and short sides 62c. A protrusion section 63c is formed on one short side 62c of the film 60c, and a recess section 64c is formed on the other short side 62c.

When attaching the film 60c to the upper layer mat 40, the film 60c is attached to the upper layer mat 40 so that the protrusion section 63c of the film 60c covers the protrusion section 43a of the upper layer mat 40, and the recess section 64c of the film 60c covers the recess section 44a of the upper layer mat 40.

As described above, when the area of the upper layer mat 40 not covered with the film 60 is decreased, it is possible to reduce the scattering of the inorganic fiber from the upper layer mat 40. Therefore, among the above-described film shapes, the shape of the film 60c is most desirable.

In the holding seal material 30 of the invention, the film 60 is not present on the second principal surface 52 of the lower layer mat 50.

Therefore, the inorganic fiber included in the lower layer mat 50 comes into direct contact with the exhaust gas treatment unit 10, and the inorganic fiber strands entangle with the surface of the exhaust gas treatment unit 10. Therefore, the adhesion between the lower layer mat 50 and the exhaust gas treatment unit 10 improves. As a result, when the exhaust gas treatment unit 10 around which the holding seal material 30 is wound is pressed into the metal casing 20, the lower layer mat 50 and the exhaust gas treatment unit 10 do not easily deviate from each other due to the friction between the inorganic fiber strands and the exhaust gas treatment unit 10, and it is possible to prevent the lower layer mat 50 from spreading out from the end section of the metal casing 20.

In the holding seal material 30 of the invention, the constituent material of the film 60 is desirably made of at least one selected from a group consisting of polyester, high-density polyethylene and polypropylene.

As described above, the holding seal material 30 of the invention is wound around the exhaust gas treatment unit 10 and is pressed into the metal casing 20. At this time, the upper layer mat 40 comes into contact with the metal casing 20 through the film 60.

When the constituent material of the film 60 is made of at least one selected from a group consisting of polyester, high-density polyethylene and polypropylene, the friction coefficient between the upper layer mat 40 and the metal casing 20 becomes low. Therefore, it is possible to smoothly press the exhaust gas treatment unit 10 around which the holding seal material 30 is wound into the metal casing 20.

In the holding seal material 30 of the invention, the thickness of the film 60 is desirably in a range of 30 μm to 60 μm.

When the thickness of the film 60 is less than 30 μm, the film 60 is too thin and is thus easily breakable.

When the thickness of the film 60 exceeds 60 μm, the amount of the inorganic fiber attached per unit weight is too great, while it is possible to press the exhaust gas treatment unit into the casing with no problem, the amount of hydrocarbon gas and the like generated due to decomposition becomes too great.

In the holding seal material 30 of the invention, the film 60 is desirably fixed to the holding seal material 30 using an adhesive material or thermal compression.

When an adhesive material or thermal compression is used, it is possible to firmly fix the film 60 to the holding seal material 30.

In the holding seal material 30 of the invention, the upper layer mat 40 and the lower layer mat 50 are fixed to each other in the two fixing sections 32, and the two fixing sections 32 extend in a direction perpendicular to the longitudinal direction of the holding seal material 30.

When the upper layer mat 40 and the lower layer mat 50 are fixed to each other in two fixing sections 32, there is no case in which the mats are separated from each other, and the deviation of the respective mats is prevented. Therefore, it becomes easy to handle the holding seal material 30. In addition, it is possible to easily wind the holding seal material 30 around the exhaust gas treatment unit 10 without individually aligning the respective mats.

Furthermore, when the two fixing sections 32 extend in a direction perpendicular to the longitudinal direction of the holding seal material 30, it is possible to prevent the respective mats from deviating in a direction perpendicular to the longitudinal direction of the holding seal material 30 when winding the holding seal material 30 around the exhaust gas treatment unit 10. In addition, when the fixing sections extend in a direction in parallel with the longitudinal direction of the holding seal material, when wining the holding seal material around the exhaust gas treatment unit, tensile stress is likely to be generated in the outer circumferential part of the holding seal material, and wrinkles are likely to be generated in the inner circumferential part of the holding seal material. However, when the fixing sections extend in a direction perpendicular to the longitudinal direction of the holding seal material 30, it is possible to prevent the generation of the tensile stress or the generation of the wrinkles, and thus a gap is not easily generated between the holding seal material 30 and the exhaust gas treatment unit 10.

In the holding seal material 30 of the invention, the distance between the two fixing sections 32 is desirably 1/20 to 3/4 of the full length of the mat having the shortest full length, that is, the full length of the lower layer mat 50.

In a case in which the distance between the two fixing sections 32 is less than 1/20 of the full length of the lower layer mat 50, the two fixing sections are present as concentrated in a single place with respect to the entire area of the mat, and thus there is a case in which it becomes difficult to prevent the deviation of the respective mats in the width direction.

When the distance between the two fixing sections 32 exceeds 3/4 of the full length of the lower layer mat 50, the region between the two fixing sections 32 widens. Since both ends of the above-described region are fixed by the two fixing sections 32, when winding the holding seal material 30 around the exhaust gas treatment unit 10, strain is likely to be generated due to the difference between the inside and outside circumferences. Therefore, tensile stress is likely to be generated on a upper layer mat 40 side, and wrinkles are likely to be generated on a lower layer mat 50 side.

In the holding seal material 30 of the invention, the fixing section 32 is desirably made of a thread, adhesive tape or an adhesive material.

A thread, adhesive tape or an adhesive material can be preferably used for the fixing section 32 fixing the plurality of mats.

Next, the exhaust gas treatment unit 10 configuring the exhaust gas purification apparatus 1 of the invention will be described.

Figure 6:
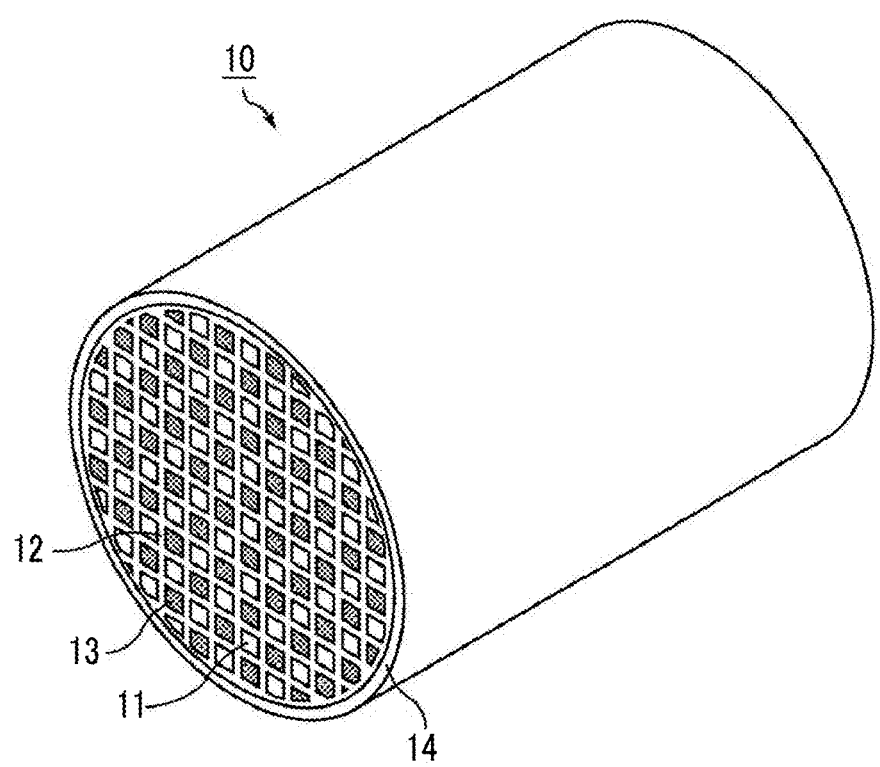
FIG. 6 is a perspective view schematically illustrating an example of an exhaust gas treatment unit configuring an exhaust gas purification apparatus of the invention.

FIG. 6 is a perspective view schematically illustrating an example of an exhaust gas treatment unit configuring the exhaust gas purification apparatus of the invention.

As illustrated in FIG. 6, the exhaust gas treatment unit 10 is made mainly of a porous ceramic, and has a substantially columnar shape. In addition, an outside circumference-coating layer 14 is provided on the outside circumference of the exhaust gas treatment unit 10 for the purpose of reinforcing the outside circumferential section of the exhaust gas treatment unit 10, trimming the shape or improving the heat-insulating properties of the exhaust gas treatment unit 10.

Meanwhile, the configuration of the inside of the exhaust gas treatment unit 10 is as already described in the description of the exhaust gas purification apparatus 1 of the invention (refer to FIG. 1).

The exhaust gas treatment unit 10 may be made of a porous non-oxide ceramic such as silicon carbide or silicon nitride, or may be made of a porous oxide ceramic such as sialon, alumina, cordierite or mullite. Among the above-described materials, silicon carbide is desirable.

In a case in which the exhaust gas treatment unit 10 is made of a porous silicon carbide ceramic, the porosity of the porous ceramic is not particularly limited, but is desirably in a range of 35% to 60%.

This is because, when the porosity is less than 35%, there is a case in which the exhaust gas treatment unit is immediately clogged, and, on the other hand, when the porosity exceeds 60%, there is a case in which the strength of the exhaust gas treatment unit decreases and the exhaust gas treatment unit is easily broken.

In addition, the average pore diameter of the porous ceramic is desirably in a range of 5 μm to 30 μm.

This is because, when the average pore diameter is less than 5 μm, there is a case in which PM easily causes clogging, and, on the other hand, when the average pore diameter exceeds 30 μm, PM passes through pores, it is not possible to trap PM and there is a case in which the exhaust gas treatment unit cannot function as a filter.

Meanwhile, the porosity and pore diameter can be measured using a well-known measurement method of the related art using a scanning electron microscope (SEM).

The cell density in a cross-section of the exhaust gas treatment unit 10 is not particularly limited, but a desirable lower limit is 31.0 cells/cm$^2$ (200 cells/inch$^2$), a desirable upper limit is 93.0 cells/cm$^2$ (600 cells/inch$^2$), a more desirable lower limit is 38.8 cells/cm$^2$ (250 cells/inch$^2$), and a more desirable upper limit is 77.5 cells/cm$^2$ (500 cells/inch$^2$).

The exhaust gas treatment unit 10 may carry a catalyst for purifying exhaust gas, and, for example, a noble metal such as platinum, palladium or rhodium is desirable as the carried catalyst, and platinum is more desirable among the above-described noble metals. In addition, as other catalysts, it is also possible to use, for example, an alkali metal such as potassium or sodium and an alkali earth metal such as barium. The above-described catalysts may be solely used, or two or more thereof may be jointly used.

When the above-described catalyst is carried, it becomes easy to remove PM through combustion, and it also becomes possible to purify harmful exhaust gas.

Next, the metal casing 20 configuring the exhaust gas purification apparatus 1 will be described.

Figure 7:
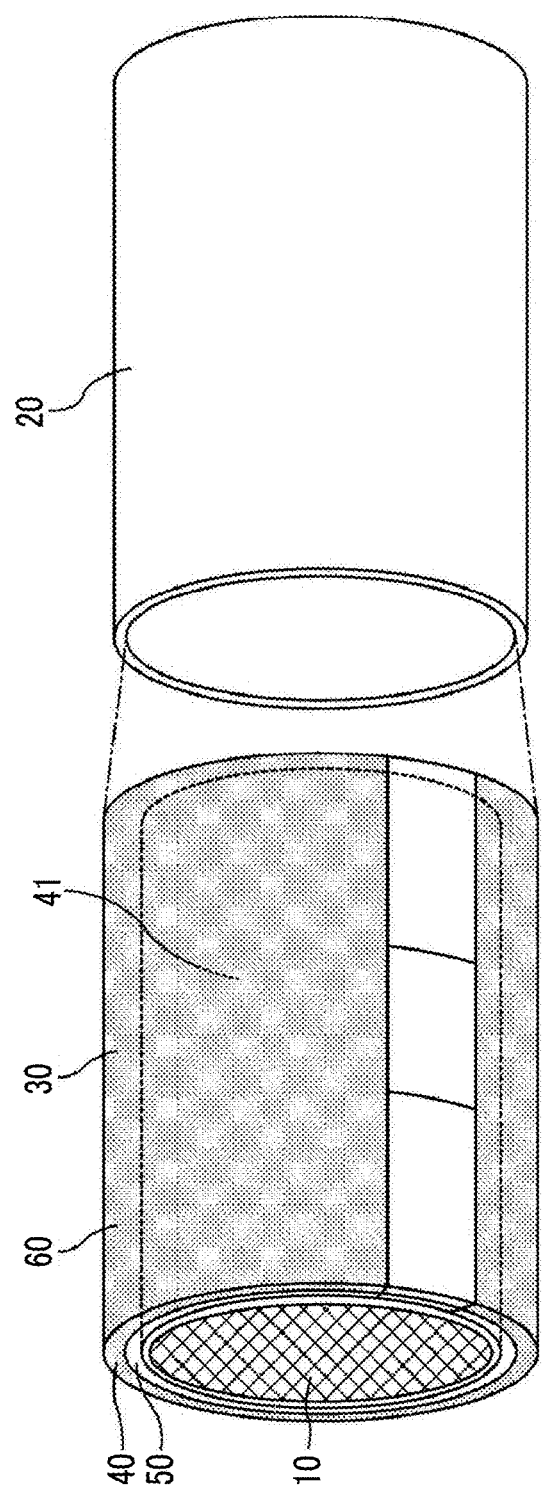
FIG. 7 is a perspective view schematically illustrating an example of a step of housing an exhaust gas treatment unit around which the holding seal material of the invention is wound in a metal casing.

FIG. 7 is a perspective view schematically illustrating an example of a step of housing the exhaust gas treatment unit around which the holding seal material of the invention is wound in the metal casing.

In FIG. 7, the holding seal material 30 of the invention is wound around the exhaust gas treatment unit 10 so that the upper layer mat 40 is on the metal casing 20 side and the lower layer mat 50 is on the exhaust gas treatment unit 10 side.

The exhaust gas treatment unit 10 around which the holding seal material 30 of the invention is wound is pressed into the metal casing 20.

The metal casing 20 is made mainly of metal such as stainless steel, and the shape of the metal casing may be a substantially cylindrical shape having smaller inner diameters at both end sections than an inner diameter in the center section as illustrated in FIG. 1, or a substantially cylindrical shape having a constant inner diameter as illustrated in FIG. 7.

The inner diameter of the metal casing 20 (the inner diameter at a part at which the exhaust gas treatment unit is housed) is desirably slightly smaller than the total length of the diameter of the end surface of the exhaust gas treatment unit 10 and the thickness of the holding seal material 30 wound around the exhaust gas treatment unit 10.

Next, manufacturing methods for the holding seal material 30 of the invention and the exhaust gas purification apparatus 1 of the invention will be described using examples.

(a) Mat Preparation Step

First, a step of preparing a mat made of an inorganic fiber on which a needle punching treatment has been carried out is carried out.

The mat can be obtained using a variety of methods, and, for example, can be manufactured using the following method. That is, first, for example, a mixture for spinning made of an aqueous solution of basic aluminum chloride, silica sol and the like is spun as raw materials using a blowing method so as to produce an inorganic fiber precursor having an average fiber diameter in a range of 3 μm to 10 μm. Subsequently, a continuous sheet-like substance having a predetermined size is produced by compressing the inorganic fiber precursor, and is subjected to a needle punching treatment and then a firing treatment. After the above-described step, the preparation of the upper layer mat 40 and the lower layer mat 50 is completed.

(b) Film Attaching Step

Next, a step of attaching the film 60 to the upper layer mat 40 is carried out.

First, the film 60 is cut into a predetermined shape. Subsequently, the film 60 is continuously wound once in a direction perpendicular to the longitudinal direction of the upper layer mat 40 from the winding start section 47 to the winding end section 48 on the second principal surface 42 of the upper layer mat 40 and be attached to the surface of the mat. At this time, the winding start section 47 and the winding end section 48 are separated from each other so as to expose a part of the second principal surface 42 of the upper layer mat 40. Regarding the attachment of the film 60, it is possible to apply an adhesive material to the film 60 in advance and attach the film when covering the upper layer mat 40 with the film 60, or it is possible to cover the upper layer mat 40 with the film 60 and then attach the film using thermal compression.

(c) Lamination Step

In this step, first, the upper layer mat 40 is laminated on the lower layer mat 50 so that the first principal surface 51 of the lower layer mat 50 and the second principal surface 42 of the upper layer mat 40 come into contact with each other. Next, two fixing sections 32 are provided using thread stitching, and the laminated mats are fixed to each other. The locations at which the fixing sections 32 are provided have already been described, and thus description thereof will not be repeated.

The laminated mat that has been subjected to the above-described steps becomes the holding seal material 30 that is an example of the holding seal material of the invention.

The mat preparation step (a) may include a step of attaching an organic binder and an inorganic binder to the inorganic fiber.

The method and order for attaching an organic binder and an inorganic binder to the inorganic fiber are not limited, and, for example, after a firing treatment, binders may be soaked into the mat by immersing the mat in a solution containing the binders or binders may be soaked into the mat by dropping the binders onto the mat using a curtain coating method or the like. After that, it is possible to adjust the attached amount of the binders by suctioning and dehydrating the binder-attached mat.

Next, an example of a method for manufacturing the exhaust gas purification apparatus 1 that is an example of the exhaust gas purification apparatus of the invention using the above-described holding seal material 30 will be described.

The manufacturing method for the exhaust gas purification apparatus 1 of the invention is a method for manufacturing the exhaust gas purification apparatus 1 that includes the exhaust gas treatment unit 10, the metal casing 20 housing the exhaust gas treatment unit 10, and the holding seal material 30 disposed between the exhaust gas treatment unit 10 and the metal casing 20, in which the holding seal material 30 is the holding seal material manufactured using the manufacturing method for the holding seal material of the invention, including a step of winding the laminated mat (holding seal material 30) around the exhaust gas treatment unit 10 so that the upper layer mat 40 is on the metal casing 20 side and the lower layer mat 50 is on the exhaust gas treatment unit 10 side, and a step of pressing the exhaust gas treatment unit 10 around which the laminated mat (holding seal material 30) is wound into the metal casing 20.

(d) Winding Step

A step of winding the holding seal material 30 of the invention around the exhaust gas treatment unit 10 is carried out.

In this step, the holding seal material 30 is wound so that the second principal surface 52 of the lower layer mat 50 configuring the holding seal material 30 of the invention comes into contact with the outside circumference of the substantially columnar exhaust gas treatment unit 10 produced using a well-known method of the related art. At this time, the protrusion section 53a and the recess section 54a of the lower layer mat 50 are engaged with each other, and the protrusion section 43a and the recess section 44a of the lower layer mat 40 are engaged with each other.

(e) Press-in Step

Next, as illustrated in FIG. 7, a step of pressing the exhaust gas treatment unit 10 around which the holding seal material 30 is wound into the metal casing 20 having a substantially cylindrical shape with a predetermined size and made mainly of metal or the like using a press-in method (stuffing method) is carried out.

After the above-described steps, the exhaust gas purification apparatus 1 that is an example of the exhaust gas purification apparatus of the invention is manufactured.

Furthermore, the holding seal material of the invention and the exhaust gas purification apparatus of the invention may have the following configuration.

In the above description of the holding seal material of the invention, the holding seal material is a laminated mat made up of two mats, but the holding seal material of the invention may be a laminated mat made up of two or more mats.

In this case, among a plurality of the mats, a mat having the shortest full length comes into contact with the exhaust gas treatment unit, and a mat having the longest full length comes into contact with the metal casing.

In the above description of the holding seal material of the invention, the mats configuring the holding seal material are fixed to each other in the two fixing sections, but the mats may be fixed to each other in one fixing section, or may be fixed to each other at three or more fixing sections.

In the above description of the holding seal material of the invention, the mats configuring the holding seal material are fixed using the fixing sections; however, in the holding seal material of the invention, the mats may be united using at least one band-like body having no fixing force. In the holding seal material having the above-described configuration, since the mats are not fixed to each other, it is possible to deviate the mats in the longitudinal direction when winding the holding seal material around the exhaust gas treatment unit. Therefore, even in a case in which the mats are in deviated locations, it is possible to finely adjust the relative locations of the mats when winding the holding seal material around the exhaust gas treatment unit. As a result, a gap is not easily generated in the part in which the end surfaces of the holding seal material are joined together.

In addition, the band-like body is desirably made of paper or a resin. Paper or a resin can be preferably used as the band-like body having no fixing force between the mat surface and the band-like body.

In the above description of the exhaust gas purification apparatus of the invention, the exhaust gas treatment unit is an integrated exhaust gas treatment unit, but the exhaust gas treatment unit configuring the exhaust gas purification apparatus of the invention may be a combined exhaust gas treatment unit obtained by uniting a plurality of units through an adhesive layer.

The shape of the exhaust gas treatment unit configuring the exhaust gas purification apparatus of the invention is not limited to a columnar shape, and may be an arbitrary shape, for example, an oval columnar shape or a square columnar shape.

Thus far, a filter having cells sealed at any one end sections has been described as the exhaust gas treatment unit, but the exhaust gas treatment unit configuring the exhaust gas purification apparatus of the invention may have cells not sealed at end sections. The above-described exhaust gas treatment unit can be preferably used as a catalyst carrier.

Hereinafter, the action effects of the holding seal material of the invention, the manufacturing method for a holding seal material, an exhaust gas purification apparatus and the manufacturing method for an exhaust gas purification apparatus will be listed.

(1) The holding seal material of the invention is made of a laminated mat configured by laminating a plurality of mats containing an inorganic fiber and having a rectangular planar shape so that the longitudinal-direction lengths of the respective mats sequentially increase as the mats are laminated. Therefore, when the holding seal material of the invention is wound around the exhaust gas treatment unit, a gap caused by the difference between the inside and outside circumferences is not easily generated in a part in which the end surfaces of the holding seal material of the invention are joined together. Therefore, the exhaust gas purification apparatus for which the holding seal material of the invention is used has a sufficient sealing property against the leakage of exhaust gas.

(2) In the holding seal material of the invention, a film is attached to the principal surface of the mat configuring the laminated mat and having the longest longitudinal-direction length on the opposite side to the side on which the mat having the longest longitudinal-direction length is in contact with other mats.

The inorganic fiber scatters from the surfaces of the mats. Particularly, the curvature radius of the mat located in the outermost layer of the laminated mat becomes largest when the holding seal material is wound around the exhaust gas treatment unit, and therefore tensile stress also becomes largest. The inorganic fiber is likely to be shattered due to the tensile stress. As a result, fissures and the like are generated on the mat surfaces, and the inorganic fiber is likely to scatter.

However, when a film is attached as in the holding seal material of the invention, it is possible to reduce the above-described scattering of the inorganic fiber.

(3) In the holding seal material of the invention, a film is attached to the longitudinal-direction side surfaces of the mat having the longest longitudinal-direction length.

When the exhaust gas treatment unit around which the holding seal material is wound is pressed into the metal casing, the holding seal material is compressed in the thickness direction. Therefore, it is likely that air leaks from the longitudinal-direction side surfaces of the holding seal material. Along with the leakage of air, the inorganic fiber is also likely to scatter. When a film is attached to the longitudinal-direction side surfaces of the mat having the longest longitudinal-direction length as in the holding seal material of the invention, it is possible to reduce the scattering of the inorganic fiber from the part to which the film is attached. Therefore, it is possible to reduce the scattering of the inorganic fiber when handling the holding seal material of the invention.

(4) In the holding seal material of the invention, the film is attached to the principal surface of the mat having the longest longitudinal-direction length on the side on which the mat having the longest longitudinal-direction length is in contact with other mats in a state in which a part of the principal surface is exposed. In the exposed part, the mat having the longest longitudinal-direction length comes into direct contact with other mats. That is, in the exposed part, the inorganic fiber strands included in the respective mats come into direct contact with each other and are entangled with each other, whereby the adhesion between the mats improve. Furthermore, when the exhaust gas treatment unit around which the holding seal material of the invention is wound is pressed into the metal casing, the mat having the longest longitudinal-direction length and other mats in contact with the mat do not easily deviate from each other due to the friction between the inorganic fiber strands. Therefore, it is possible to prevent the mat from spreading out from the end section of the metal casing.

EXAMPLES

Hereinafter, examples disclosing the invention more specifically will be described. Meanwhile, the invention is not limited to the examples.

Example 1

(a) Mat Preparation Step (a-1) Spinning Step

Silica sol was blended with a basic aqueous solution of aluminum chloride which had an Al content of 70 g/l and was prepared so as to obtain Al:Cl=1:1.8 (atomic ratio) so that the composition ratio in the inorganic fiber after firing became $Al_2O_3:SiO_2=72:28$ (weight ratio), and furthermore, an appropriate amount of an organic polymer (polyvinyl alcohol) was added, thereby preparing a liquid mixture.

The obtained liquid mixture was condensed so as to produce a spinning mixture, and the spinning mixture was spun using a blowing method so as to produce an inorganic fiber precursor having an average fiber length of 100 mm and an average fiber diameter of 5.1 μm.

(a-2) Compression Step

The inorganic fiber precursor obtained in the above-described step (a-1) was compressed, thereby producing a continuous sheet-like substance.

(a-3) Needle Punching Treatment Step

A needle punching treatment was continuously carried out on the sheet-like substance obtained in the above-described step (a-2) using conditions described below, thereby producing a needle-punching-treated body.

First, a needle board provided with needles at a density of 21 needles/cm$^2$ was prepared. Next, the needle board was disposed above one surface of the sheet-like substance, and a needle punching treatment was carried out by dropping and lifting the needle board once in the thickness direction of the sheet-like substance, thereby producing a needle-punching-treated body. At this time, the needles were made to penetrate the sheet-like substance until barbs formed at front end sections of the needles completely penetrate the opposite surface of the sheet-like substance.

(a-4) Firing Step

The needle-punching-treated body obtained in the above-described step (a-3) was continuously fired at a peak temperature of 1250° C., and a fired sheet-like substance made of an inorganic fiber containing alumina and silica was manufactured. The average fiber diameter of the inorganic fiber was 5.1 μm, and the minimum value of the inorganic fiber diameter was 3.2 μm. The alumina fiber holding seal material obtained in the above-described manner had a bulk density of 0.15 g/cm$^3$ and a basis weight of 1400 g/m$^2$.

(a-5) Cutting Step

The fired sheet-like substance obtained in the above-described step (a-4) was cut, thereby producing cut sheet-like substances.

(a-6) Soaking Step

The cut sheet-like substance obtained in the above-described step (a-5) was flow-coated with an organic binder solution containing an acrylic resin (acrylic latex) as an organic binder so as to soak the organic binder into the cut sheet-like substance, thereby producing a soaked sheet-like substance.

(a-7) Drying Step

After excessive organic binder solution was suctioned and removed from the soaked sheet-like substance obtained in the above-described step (a-6), the soaked sheet-like substance was compressed and dried so as to make the thickness thin, thereby producing a needle-punching-treated mat having a thickness of 6.8 mm.

(a-8) Cutting Step

The mat obtained in the above-described step (a-7) was cut into planar dimensions of a full length of 1089 mm and a width of 371 mm with a protrusion section 43a having a length of 24.5 mm and a width of 100 mm formed at one end and a recess section 44a engaging with the protrusion section 43a formed at the other end, thereby forming an upper layer mat 40. Similarly, the mat obtained in the step (a-7) was cut into planar dimensions of a full length of 1023 mm and a width of 371 mm, thereby forming a lower layer mat 50.

(b) Film Attaching Step

A polyester adhesive material-attached film (thickness 40 µm; manufactured by Kato Seiko Co., Ltd.) was cut into a substantially rectangular shape having a full length of 1050 mm and a width of 422 mm.

Subsequently, from a winding start section 47 on the second principal surface 42 of the upper layer mat 40 as a start section for winding, the film was continuously wound up to a winding end section 48 on the second principal surface 42 of the upper layer mat 40 along the second principal surface 42 of the upper layer mat 40, the first side surface 45, the first principal surface 41, the second side surface 46 and the second principal surface 42, and was attached to the surfaces. In addition, the winding start section 47 was located at a position 25 mm away from the first side surface 45 of the upper layer mat 40 toward the second side surface 46, and the winding end section 48 was located at a position 25 mm away from the second side surface 46 of the upper layer mat 40 toward the first side surface 45.

(c) Laminating Step

The upper layer mat 40 was laminated on the lower layer mat 50 so as to bring the first principal surface 51 of the lower layer mat 50 and the second principal surface 42 of the upper layer mat 40 into contact with each other.

Next, two fixing sections were provided using thread stitching, and the upper layer mat 40 and the lower layer mat 50 were fixed to each other.

Meanwhile, the two fixing sections extended in a direction perpendicular to the longitudinal direction of the laminated mat, and the distance between the respective fixing sections was set to 70 mm.

A holding seal material produced in the above-described manner serves as a holding seal material 30 according to Example 1. When the holding seal material is cut in a direction perpendicular to the longitudinal direction of the holding seal material 30 according to Example 1, a cross-section as illustrated in FIG. 4 is obtained.

(d) Winding Step (d-1) Production of a Compact for an Exhaust Gas Treatment Unit 52.8 weight % of coarse powder of silicon carbide having an average particle diameter of 22 µm and 22.6 weight % of fine powder of silicon carbide having an average particle diameter of 0.5 µm were mixed, 2.1 weight % of an acrylic resin, 4.6 weight % of an organic binder (methyl cellulose), 2.8 weight % of a lubricant (manufactured by NOF Corporation, UNILUBE), 1.3 weight % of glycerin and 13.8 weight % of water were added to the obtained mixture, and stirred so as to obtain a wet mixture, extrusion was carried out, and a compact for an exhaust gas treatment unit 10 illustrated in FIG. 6 was produced.

(d-2) Drying Step

The raw compact for the exhaust gas treatment unit 10 obtained in the above-described step (d-1) was dried using a microwave dryer, thereby producing a dried body for the exhaust gas treatment unit 10.

(d-3) Defatting Step

The dried body for the exhaust gas treatment unit 10 obtained in the above-described step (d-2) was defatted at 400° C., thereby producing a defatted body for the exhaust gas treatment unit 10.

(d-4) Firing step

A firing step was carried out on the defatted body for the exhaust gas treatment unit 10 obtained in the above-described step (d-3) under conditions of in an argon atmosphere, at normal pressure and at 2200° C. for three hours, thereby manufacturing a silicon carbide sintered body for the exhaust gas treatment unit 10 having a porosity of 45%, an average pore diameter of 15 µm, a cell density of 300 cells/inch, and a cell wall thickness of 0.25 mm (10 mil).

(d-5) Catalyst Carrying Step

The silicon carbide sintered body for the exhaust gas treatment unit 10 obtained in the above-described step (d-4) was immersed in a platinum nitrate solution, and then was held at 600° C. for one hour, thereby making a platinum catalyst carried in the cell walls 12 in the silicon carbide sintered body for the exhaust gas treatment unit 10.

The silicon carbide sintered body produced in the above-described manner serves as an exhaust gas treatment unit 10 around which the holding seal material 30 of Example 1 is wound. The exhaust gas treatment unit 10 had a substantially columnar shape with a full length of 350 mm, and had an outer diameter of 326 mm.

(d-6) Holding Seal Material Winding Step

The holding seal material 30 of the present example was wound around the exhaust gas treatment unit 10 obtained in the above-described step (d-5). At this time, the holding seal material 30 was wound so that the second principal surface 52 of the lower layer mat 50 configuring the holding seal material 30 of the example came into contact with the exhaust gas treatment unit 10. Furthermore, the protrusion section 53a and the recess section 54a of the lower layer mat 50 were engaged, and the protrusion section 43a and the recess section 44a of the upper layer mat 40 were engaged.

(e) Press-in Step

The exhaust gas treatment unit 10 around which the holding seal material 30 was wound was pressed into the metal casing 20 using a press-in method (stuffing method). The gap bulk density (GBH) of the holding seal material 30 was set to 0.4 g/cm$^3$.

An exhaust gas purification apparatus produced in the above-described manner serves as an exhaust gas purification apparatus according to Example 1.

Comparative Examples

Figure 8A:
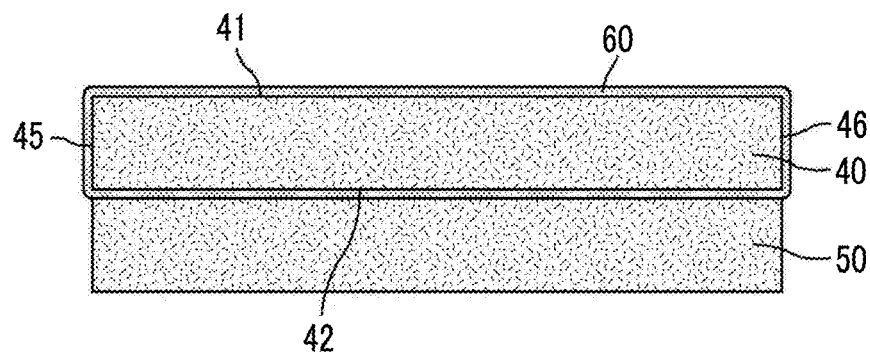
FIGS. 8A to 8C are cross-sectional views schematically illustrating examples of cross-sections of holding seal materials according to comparative examples of the invention cut in a direction perpendicular to the longitudinal direction.
Figure 8B:
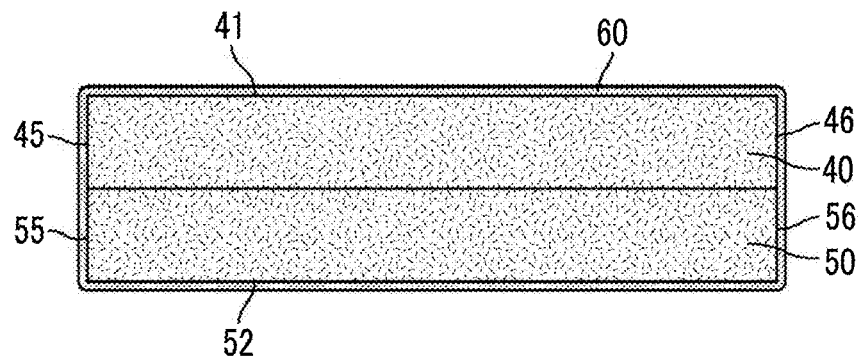
Figure 8C:
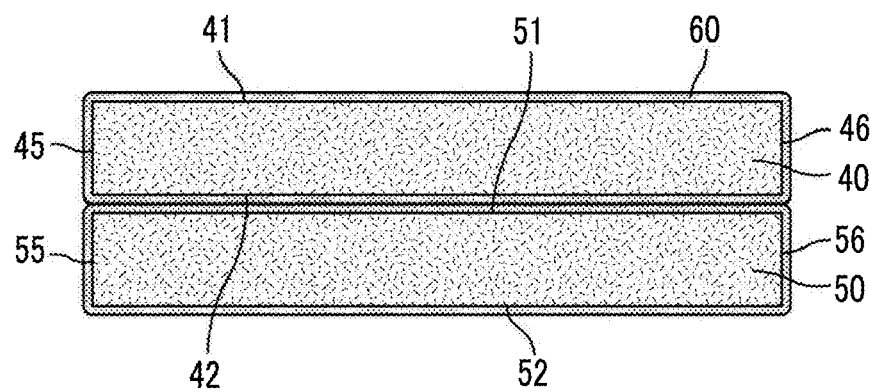

FIGS. 8A to 8C are cross-sectional views schematically illustrating examples of cross-sections of holding seal materials according to comparative examples of the invention cut in a direction perpendicular to the longitudinal direction.

Comparative Example 1

An exhaust gas purification apparatus according to Comparative Example 1 was produced in the same manner as in Example 1 except for the fact that the film attaching step (b)

in Example 1 was changed as described below to obtain a cross-section as illustrated in FIG. 8A when cutting the film in a direction perpendicular to the longitudinal direction of the holding seal material.

(b) Film Attaching Step

A polyester adhesive material-attached film was cut into a substantially rectangular shape having a full length of 1050 mm and a width of 780 mm.

Subsequently, the film was continuously wound around and attached to the upper layer mat 40 so as to fully cover the second principal surface 42, the first side surface 45, the first principal surface 41, and the second side surface 46 of the upper layer mat 40.

In a holding seal material according to Comparative Example 1, the film 60 fully blocks the upper layer mat 40 from the lower layer mat 50.

Comparative Example 2

An exhaust gas purification apparatus according to Comparative Example 2 was produced in the same manner as in Example 1 except for the fact that the order and treatments of the film attaching step (b) and the lamination step (c) in Example 1 were changed as described below to obtain a cross-section as illustrated in FIG. 8B when cutting the film in a direction perpendicular to the longitudinal direction of the holding seal material.

(b) Lamination Step

The upper layer mat 40 was laminated on the lower layer mat 50 so that the first principal surface 51 of the lower layer mat 50 and the second principal surface 42 of the upper layer mat 40 came into contact with each other.

(c) Film Attaching Step

A polyester adhesive material-attached film was cut into a substantially rectangular shape having a full length of 1000 mm and a width of 780 mm.

Subsequently, the film was continuously wound around and attached to the upper layer mat 40 and the lower layer mat 50 so as to fully cover the second principal surface 42, the first side surface 45 and the second side surface 46 of the upper layer mat 40, and the first side surface 55, the first principal surface 51 and the second side surface 56 of the lower layer mat 50.

Next, two fixing sections were provided using thread stitching, and the upper layer mat 40 and the lower layer mat 50 were fixed to each other.

Meanwhile, the two fixing sections extended in a direction perpendicular to the longitudinal direction of the laminated mat, and the distance between the respective fixing sections was set to 70 mm.

When winding a holding seal material according to Comparative Example 2 around the exhaust gas treatment unit, the film 60 fully blocks the exhaust gas treatment unit from the lower layer mat 50.

Comparative Example 3

An exhaust gas purification apparatus according to Comparative Example 3 was produced in the same manner as in Example 1 except for the fact that the film attaching step (b) in Example 1 was changed as described below to obtain a cross-section as illustrated in FIG. 8C when cutting the film in a direction perpendicular to the longitudinal direction of the holding seal material.

(b) Film Attaching Step

A polyester adhesive material-attached film was cut into a substantially rectangular shape having a full length of 1050 mm and a width of 780 mm.

Subsequently, the film was continuously wound around and attached to the upper layer mat 40 so as to fully cover the second principal surface 42, the first side surface 45, the first principal surface 41, and the second side surface 46 of the upper layer mat 40.

Next, another polyester adhesive material-attached film was cut into a substantially rectangular shape having a full length of 1000 mm and a width of 780 mm.

Subsequently, the film was continuously wound around and attached to the lower layer mat 50 so as to fully cover the second principal surface 52, the first side surface 55, the first principal surface 51, and the second side surface 56 of the lower layer mat 50.

In a holding seal material according to Comparative Example 3, the film 60 fully blocks the upper layer mat 40 from the lower layer mat 50. In addition, when winding a holding seal material according to Comparative Example 3 around the exhaust gas treatment unit, the film 60 fully blocks the exhaust gas treatment unit from the lower layer mat 50.

Each of the holding seal materials according to Example 1 and the respective comparative examples was wound around the exhaust gas treatment unit, was pressed into the metal casing, whether or not the holding seal material spread out from the end section of the metal casing was visually checked, and the housing of the holding seal material was evaluated using the following evaluation method.

Evaluation Method

Figure 9A:
FIG. 9A is a photograph illustrating a state in which the exhaust gas treatment unit around which the holding seal material of the invention is wound is normally pressed into the metal casing.
Figure 9B:
FIG. 9B is a photograph illustrating a state in which, when an exhaust gas treatment unit around which a holding seal material made of a laminated mat is wound is pressed into a metal casing, a mat forming the holding seal material deviates and the deviated mat spreads out from an end section of the metal casing.

FIG. 9A is a photograph illustrating a state in which the exhaust gas treatment unit around which the holding seal material of the invention is wound is normally pressed into the metal casing. FIG. 9B is a photograph illustrating a state in which, when an exhaust gas treatment unit around which a holding seal material made of a laminated mat is wound is pressed into a metal casing, a mat forming the holding seal material deviates and the deviated mat spreads out from an end section of the metal casing.

As illustrated in FIG. 9A, a state in which the mat did not spread out from the end section of the metal casing was evaluated as "Pass." As illustrated in FIG. 9B, a state in which the mat spread out from the end section of the metal casing was evaluated as "Fail."

The result of the housing evaluation of the holding seal material according to Example 1 was "Pass," and the holding seal material did not spread out from the end section of the metal casing.

The result of the housing evaluation of the holding seal material according to Comparative Example 1 was "Fail," the upper layer mat 40 deviated from the lower layer mat 50, and the upper layer mat 40 spread out from the end section of the metal casing. This is considered to be because the film 60 fully blocked the upper layer mat 40 from the lower layer mat 50, and therefore the adhesion therebetween was not sufficient, and the upper layer mat 40 deviated from the lower layer mat 50.

The result of the housing evaluation of the holding seal material according to Comparative Example 2 was "Fail," and, while the upper layer mat 40 did not deviate from the lower layer mat 50, the upper layer mat 40 and the lower layer mat 50 spread out from the end section of the metal casing. This is considered to be because the film 60 fully blocked the exhaust gas treatment unit from the lower layer mat 50, and therefore the adhesion therebetween was not sufficient, and the exhaust gas treatment unit deviated from the lower layer mat 50.

The result of the housing evaluation of the holding seal material according to Comparative Example 3 was "Fail," the upper layer mat 40 deviated from the lower layer mat 50, and furthermore the upper layer mat 40 and the lower layer mat 50 spread out from the end section of the metal casing. This is considered to be because the film 60 fully blocked the exhaust gas treatment unit, the upper layer mat 40 and the lower layer mat 50 from each other, and therefore the adhesion therebetween was not sufficient, and the exhaust gas treatment unit, the upper layer mat 40 and the lower layer mat 50 deviated from each other.

The essential configuration components of the holding seal material of the invention are that the holding seal material is made of a laminated mat configured by laminating a plurality of mats containing an inorganic fiber and having a rectangular planar shape so that longitudinal-direction lengths of the respective mats sequentially increase as the mats are laminated, a film is attached to a principal surface of the mat configuring the laminated mat and having a longest longitudinal-direction length on an opposite side to a side on which the mat having the longest longitudinal-direction length is in contact with other mats and longitudinal-direction side surfaces of the mat having the longest longitudinal-direction length, and the film is attached to a principal surface of the mat having the longest longitudinal-direction length on the side on which the mat having the longest longitudinal-direction length is in contact with other mats in a state in which a part of the principal surface is exposed.

When a variety of configurations described in detail in the detailed description of the invention (for example, the shape of the film, the disposition location of the film, the constituent material of the film, the fixing method of the laminated mat, and the like) are appropriately combined with the above-described essential configuration components, it is possible to obtain desired effects.

What is claimed is:

1. A holding seal material made of a laminated mat configured by laminating a plurality of mats containing an inorganic fiber and having a rectangular planar shape so that longitudinal-direction lengths of the respective mats sequentially increase as the mats are laminated,
   wherein a film is attached to, out of principal surfaces of the mat configuring the laminated mat and having a longest longitudinal-direction length, a principal surface of the mat having a longest longitudinal-direction length on an opposite side to a side on which the mat having the longest longitudinal-direction length is in contact with other mats and longitudinal-direction side surfaces of the mat having the longest longitudinal-direction length, and
   the film is attached to a principal surface of the mat having the longest longitudinal-direction length on the side on which the mat having the longest longitudinal-direction length is in contact with other mats in a state in which a part of the principal surface is exposed,
   wherein the film is continuously wound once in a direction perpendicular to the longitudinal direction of the mat having the longest longitudinal-direction length and is attached to the surfaces of the mat, a winding start section and a winding end section of the film are present on the principal surface on the side on which the mat having the longest longitudinal-direction length is in contact with other mats, and the winding start section and the winding end section are separated from each other.

2. The holding seal material according to claim 1, wherein the laminated mat is made up of two mats.

3. The holding seal material according to claim 1, wherein a constituent material of the film is made of at least one selected from a group consisting of polyester, high-density polyethylene and polypropylene.

4. The holding seal material according to claim 1, wherein the film is fixed to the laminated mat using an adhesive material or thermal compression.

5. The holding seal material according to claim 1, wherein the plurality of mats configuring the laminated mat is united using at least one band-like body having no fixing force.

6. The holding seal material according to claim 5, wherein the band-like body is made of paper or a resin.

7. The holding seal material according to claim 1, wherein the plurality of mats configuring the laminated mat are fixed to each other in at least one fixing section.

8. The holding seal material according to claim 7, wherein the fixing section extends in a direction perpendicular to the longitudinal direction of the laminated mat.

9. The holding seal material according to claim 7, wherein the fixing section is made of a thread, adhesive tape or an adhesive material.

10. An exhaust gas purification apparatus comprising:
    an exhaust gas treatment unit;
    a metal casing housing the exhaust gas treatment unit; and
    a holding seal material disposed between the exhaust gas treatment unit and the metal casing,
    wherein the holding seal material is a laminated mat configured by laminating a plurality of mats containing an inorganic fiber and having a rectangular planar shape so that longitudinal-direction lengths of the respective mats sequentially increase as the mats are laminated,
    the holding seal material is disposed so that a mat configuring the laminated mat and having a longest longitudinal-direction length is on a metal casing side and a mat configuring the laminated mat and having a shortest longitudinal-direction length is on an exhaust gas treatment unit side,
    a film is attached to a principal surface of the mat having a longest longitudinal-direction length on an opposite side to a side on which the mat having the longest longitudinal-direction length is in contact with other mats and longitudinal-direction side surfaces of the mat having the longest longitudinal-direction length, and
    the film is attached to a principal surface of the mat having the longest longitudinal-direction length on the side on which the mat having the longest longitudinal-direction length is in contact with other mats in a state in which a part of the principal surface is exposed,
    wherein the film is continuously wound once in a direction perpendicular to the longitudinal direction of the mat having the longest longitudinal-direction length and is attached to the surfaces of the mat, a winding start section and a winding end section of the film are present on the principal surface on the side on which the mat having the longest longitudinal-direction length is in contact with other mats, and the winding start section and the winding end section are separated from each other.

* * * * *